(12) United States Patent
Park

(10) Patent No.: US 7,911,900 B2
(45) Date of Patent: Mar. 22, 2011

(54) WRITE-ONCE OPTICAL DISC, AND METHOD AND APPARATUS FOR RECORDING MANAGEMENT INFORMATION ON THE WRITE-ONCE OPTICAL DISC

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 983 days.

(21) Appl. No.: 10/934,566

(22) Filed: Sep. 7, 2004

(65) Prior Publication Data

US 2005/0052973 A1    Mar. 10, 2005

(30) Foreign Application Priority Data

Sep. 8, 2003  (KR) .................. 10-2003-0062674
Oct. 13, 2003  (KR) .................. 10-2003-0071127
May 20, 2004  (KR) .................. 10-2004-0036073

(51) Int. Cl.
*G11B 5/09* (2006.01)

(52) U.S. Cl. ............... 369/47.22; 369/53.24; 369/59.25; 369/275.3

(58) Field of Classification Search ............... 369/47.22, 369/47.23, 47.14, 53.15, 53.21, 275.2, 47.27, 369/53.31, 59.25, 275.3; 386/95, 125, 126; 711/112; 714/701
See application file for complete search history.

(56) References Cited

U.S. PATENT DOCUMENTS

| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,426,624 A | 6/1995 | Goto |
| 5,442,611 A | 8/1995 | Hosaka et al. |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner* — Hoa T Nguyen
*Assistant Examiner* — Kim-Kwok Chu
(74) *Attorney, Agent, or Firm* — Birch, Stewart, Kolasch & Birch, LLP

(57) ABSTRACT

A write-once optical disc and a method and apparatus for recording management information of the write-once optical disc, are provided. The method includes sequentially recording data in the at least one recording-unit in the direction of increasing address; padding, with padding data, a remaining non-recorded part of a last recording-unit when terminating the sequential recording of the data; and recording padding identification information on the recording medium, the padding identification information identifying which part of the at least one recording-unit is padded.

17 Claims, 25 Drawing Sheets

U.S. PATENT DOCUMENTS

| | | | |
|---|---|---|---|
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,555,537 A | 9/1996 | Imaino et al. |
| 5,568,467 A | 10/1996 | Inagaki et al. |
| 5,577,194 A | 11/1996 | Wells et al. |
| 5,608,715 A | 3/1997 | Yokogawa et al. |
| 5,666,531 A | 9/1997 | Martin |
| 5,715,221 A | 2/1998 | Ito et al. |
| 5,720,030 A | 2/1998 | Kamihara et al. |
| 5,732,053 A | 3/1998 | Yano et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,825,726 A | 10/1998 | Hwang et al. |
| 5,848,038 A | 12/1998 | Igarashi et al. |
| 5,860,088 A | 1/1999 | Benhase et al. |
| 5,862,117 A | 1/1999 | Fuentes et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,418,100 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,031,239 B2 | 4/2006 | Takahashi et al. |
| 7,042,825 B2 | 5/2006 | Yamamoto et al. |
| 7,050,701 B1* | 5/2006 | Sasaki et al. .................. 386/95 |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,372,792 B2* | 5/2008 | Park .......................... 369/47.22 |
| 7,379,402 B2 | 5/2008 | Ko et al. |
| 7,506,109 B2 | 3/2009 | Park |
| 2001/0009537 A1 | 7/2001 | Park |
| 2001/0011267 A1 | 8/2001 | Kihara et al. |
| 2001/0021144 A1 | 9/2001 | Oshima et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0035705 A1 | 3/2002 | Ando et al. |
| 2002/0049938 A1 | 4/2002 | Ko |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2002/0186341 A1 | 12/2002 | Yamamura et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0133369 A1 | 7/2003 | Sasaki |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0137913 A1 | 7/2003 | Oshima et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0160799 A1 | 8/2004 | Park et al. |
| 2004/0165495 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1* | 1/2005 | Ito et al. .................. 369/47.14 |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |

| | | | |
|---|---|---|---|
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0136134 A1 | 6/2006 | Mihara | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2006/0280076 A1 | 12/2006 | Bondijk | |
| 2007/0294571 A1 | 12/2007 | Park et al. | |
| 2008/0046780 A1 | 2/2008 | Shibuya et al. | |

FOREIGN PATENT DOCUMENTS

| | | | |
|---|---|---|---|
| CN | 1140897 C | 1/1997 | |
| CN | 1227950 A | 9/1999 | |
| CN | 1273419 A | 11/2000 | |
| CN | 1675708 A | 9/2005 | |
| CN | 1685426 A | 10/2005 | |
| DE | 199 54 054 A1 | 6/2000 | |
| EP | 0314186 A2 | 5/1989 | |
| EP | 0325823 A1 | 8/1989 | |
| EP | 0350920 A2 | 1/1990 | |
| EP | 0464811 A2 | 1/1992 | |
| EP | 0472484 A2 | 2/1992 | |
| EP | 0477503 A2 | 4/1992 | |
| EP | 0556046 A1 | 8/1993 | |
| EP | 0871172 A2 | 10/1998 | |
| EP | 0908882 A2 | 4/1999 | |
| EP | 0 971 345 A1 | 1/2000 | |
| EP | 0974967 A1 | 1/2000 | |
| EP | 0989554 A1 | 3/2000 | |
| EP | 0997904 A1 | 5/2000 | |
| EP | 1026681 B1 | 8/2000 | |
| EP | 1 040 937 A1 | 10/2000 | |
| EP | 1043723 A1 | 10/2000 | |
| EP | 1132914 A2 | 9/2001 | |
| EP | 1148493 A2 | 10/2001 | |
| EP | 1152414 A2 | 11/2001 | |
| EP | 1239478 A1 | 9/2002 | |
| EP | 1274081 A2 | 1/2003 | |
| EP | 1298659 A1 | 4/2003 | |
| EP | 1 321 940 A1 | 6/2003 | |
| EP | 1329888 A1 | 7/2003 | |
| EP | 1347452 A2 | 9/2003 | |
| EP | 1547065 A0 | 6/2005 | |
| EP | 1564740 A1 | 8/2005 | |
| EP | 1573723 A0 | 9/2005 | |
| EP | 1612790 A1 | 1/2006 | |
| EP | 1 623 421 A0 | 2/2006 | |
| EP | 1623422 A0 | 2/2006 | |
| EP | 1 644 920 A0 | 4/2006 | |
| EP | 1 658 613 A0 | 5/2006 | |
| GB | 2356735 A | 5/2001 | |
| JP | 63-091842 A | 4/1988 | |
| JP | 64-079940 A | 3/1989 | |
| JP | 01-263955 A | 10/1989 | |
| JP | 02-023417 A | 1/1990 | |
| JP | 2-054327 A | 2/1990 | |
| JP | 3-46164 A | 2/1991 | |
| JP | 05-274814 A | 10/1993 | |
| JP | 6-20449 A | 1/1994 | |
| JP | 6-309802 A | 11/1994 | |
| JP | 06-349201 A | 12/1994 | |
| JP | 7-168749 A | 7/1995 | |
| JP | 7-220400 A | 8/1995 | |
| JP | 08-096522 A | 4/1996 | |
| JP | 8-147702 A | 6/1996 | |
| JP | 8-273162 A | 10/1996 | |
| JP | 8-287595 A | 11/1996 | |
| JP | 9-45004 A | 2/1997 | |
| JP | 09-145634 A | 6/1997 | |
| JP | 09-231053 A | 9/1997 | |
| JP | 9-270175 A | 10/1997 | |
| JP | 09-282849 A | 10/1997 | |
| JP | 9-288884 A | 11/1997 | |
| JP | 10-49991 A | 2/1998 | |
| JP | 10-050005 A | 2/1998 | |
| JP | 10-050032 A | 2/1998 | |
| JP | 10-187356 | 7/1998 | |
| JP | 10-187356 A | 7/1998 | |
| JP | 10-187357 | 7/1998 | |
| JP | 10-187358 A | 7/1998 | |
| JP | 10-187359 | 7/1998 | |
| JP | 10-187360 | 7/1998 | |
| JP | 10-187361 A1 | 7/1998 | |
| JP | 10-199154 A | 7/1998 | |
| JP | 11-110888 A | 4/1999 | |
| JP | 11-203792 A | 7/1999 | |
| JP | 2000-090588 A | 3/2000 | |
| JP | 2000-149449 A | 5/2000 | |
| JP | 2000-195178 A | 7/2000 | |
| JP | 2000-215612 | 8/2000 | |
| JP | 2000-285607 A | 10/2000 | |
| JP | 2000-348057 A | 12/2000 | |
| JP | 2001-023317 A | 1/2001 | |
| JP | 2001-069440 A | 3/2001 | |
| JP | 2001-110168 A | 4/2001 | |
| JP | 2001-148166 A | 5/2001 | |
| JP | 2001/319339 A | 11/2001 | |
| JP | 2001-351334 A | 12/2001 | |
| JP | 2001-357623 A | 12/2001 | |
| JP | 2002-015507 A | 1/2002 | |
| JP | 2002-015525 A | 1/2002 | |
| JP | 2002-056619 A | 2/2002 | |
| JP | 2002-117649 A | 4/2002 | |
| JP | 2002-117652 A | 4/2002 | |
| JP | 2002/170342 A | 6/2002 | |
| JP | 2002-215612 A | 8/2002 | |
| JP | 2002-245723 A | 8/2002 | |
| JP | 2002-288938 A | 10/2002 | |
| JP | 2002-329321 A | 11/2002 | |
| JP | 2002-352522 A | 12/2002 | |
| JP | 2003-30844 A | 1/2003 | |
| JP | 2003/228962 A | 8/2003 | |
| JP | 2003-249029 A | 9/2003 | |
| JP | 2003/335062 A | 11/2003 | |
| JP | 2003-536194 A | 12/2003 | |
| JP | 2004-79087 A | 3/2004 | |
| JP | 2004/095057 A | 3/2004 | |
| JP | 2004-118910 A | 4/2004 | |
| JP | 2004/213774 A | 7/2004 | |
| JP | 2004-280864 A | 10/2004 | |
| JP | 2004-280865 A | 10/2004 | |
| JP | 2004-280866 A | 10/2004 | |
| JP | 2005-32374 A | 2/2005 | |
| JP | 2005-44495 A | 2/2005 | |
| JP | 2005-004912 A | 6/2005 | |
| JP | 2005-535993 A | 11/2005 | |
| JP | 2005-538490 A | 12/2005 | |
| JP | 2005-538491 A | 12/2005 | |
| JP | 2006-519445 A | 8/2006 | |
| JP | 2007-502512 A | 2/2007 | |
| JP | 2007-66515 A | 3/2007 | |
| KR | 1020040094301 A | 11/2004 | |
| KR | 10-2006-0052789 A | 5/2006 | |
| RU | 2005 103 626 | 9/2005 | |
| RU | 2005 127 337 | 2/2006 | |
| TW | 302475 A | 3/1985 | |
| TW | 283232 A | 8/1996 | |
| TW | 371752 | 10/1999 | |
| TW | 413805 | 12/2000 | |
| TW | 495750 B | 7/2002 | |
| WO | WO-84/00628 A1 | 2/1984 | |
| WO | WO-96/30902 A1 | 10/1996 | |
| WO | WO-97/22182 A1 | 6/1997 | |
| WO | WO 00/19432 A1 | 4/2000 | |
| WO | WO-00/54274 A1 | 9/2000 | |
| WO | WO-01/22416 A1 | 3/2001 | |

| | | | |
|---|---|---|---|
| WO | WO-01/75879 A1 | 10/2001 |
| WO | WO-01/93035 A2 | 12/2001 |
| WO | WO 02/086887 A1 | 10/2002 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/015780 A1 | 2/2004 |
| WO | WO-2004/025648 A1 | 3/2004 |
| WO | WO-2004/025649 A1 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/015180 A1 | 9/2004 |
| WO | WO-2004/077415 A1 | 9/2004 |
| WO | WO-2004/079631 A2 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO 2004/105024 A1 | 12/2004 |
| WO | WO-2005/004123 A1 | 1/2005 |
| WO | WO-2005/004154 A2 | 1/2005 |
| WO | WO-2005/006314 A1 | 1/2005 |

OTHER PUBLICATIONS

Nick Parlante; "Linked List Basics"; Document #103 in the Stanford CS Education Library; 1998-2001; pp. 1-26.

* cited by examiner

List of SRR entries(30)

SRR entry(35)

FIG. 6C

List of opened SRRs

| Contents | number of bytes |
|---|---|
| 1st Opened SRR number | 2 |
| 2nd Opened SRR number | 2 |
| ⋮ | ⋮ |
| 16th Opened SRR number | 2 |

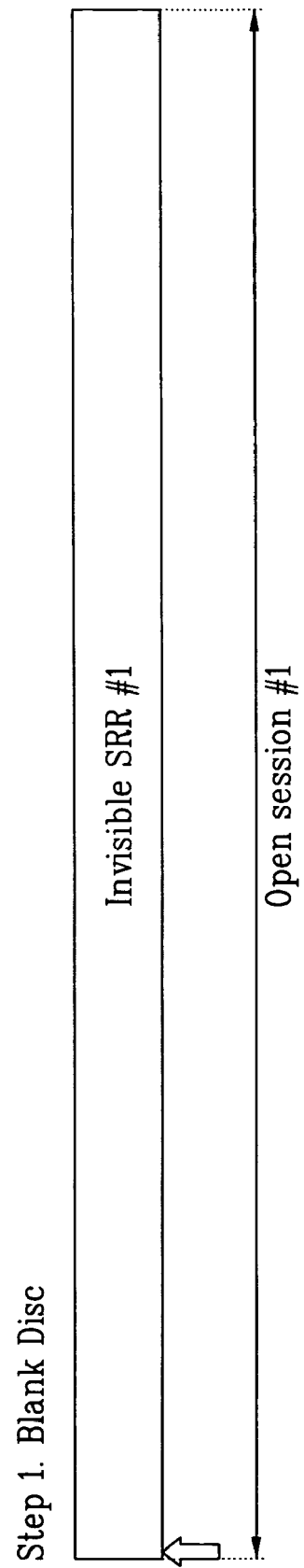

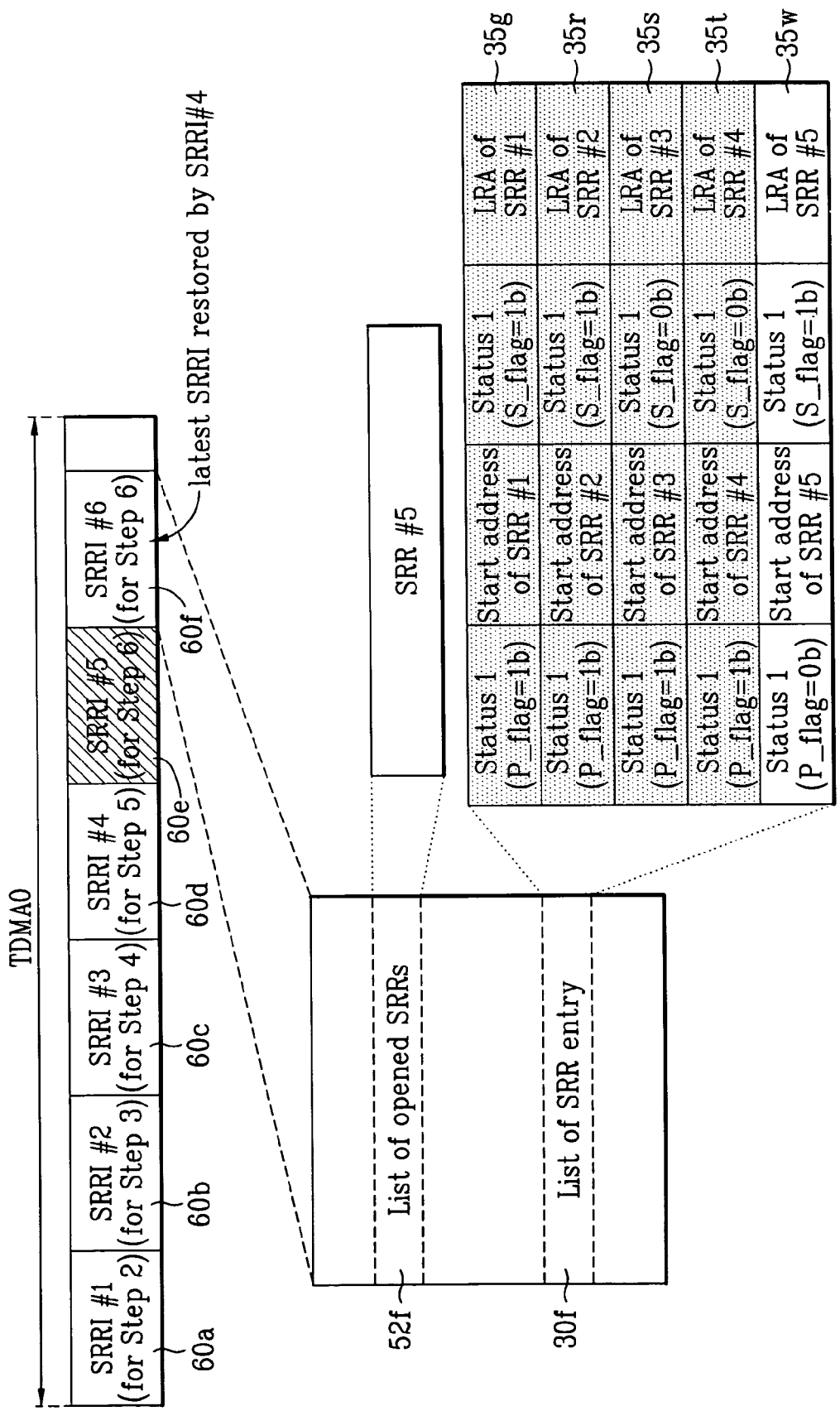

WRITE-ONCE OPTICAL DISC, AND METHOD AND APPARATUS FOR RECORDING MANAGEMENT INFORMATION ON THE WRITE-ONCE OPTICAL DISC

This application claims the benefit of Patent Application No. 2003-062674 filed in Republic of Korea on Sep. 8, 2003; No. 2003-071127 filed in Republic of Korea on Oct. 13, 2003; and No. 2004-036073 filed in Republic of Korea on May 20, 2004. The entire contents of each of these applications are hereby incorporated by reference.

BACKGROUND OF THE INVENTION

1. Field of the Invention

The present invention relates to a write-once optical disc, a method for recording management information of the write-once optical disc and a method and apparatus for recording and playing back the write-once optical disc.

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long term period.

The Blu-ray disc is the next generation HD-DVD technology and the next generation optical recording solution, and has an excellent capability to store data more than the existing DVDs. Recently, a technical specification of international standard for HD-DVD has been established. Related with this, various standards for a write-once Blu-ray disc (BD-WO) are being prepared following the standards for a rewritable Blu-ray disc (BD-RE).

Among the standards for the write-once Blu-ray disc (BD-WO), a method for recording management information has been discussed. This method involves a recording method of an information indicating a recording status of the disc, which is one of the characteristics of the write-once optical disc.

The information indicating the recording status of the disc allows a host or a user to easily find a recordable area on the write-once optical disc. In the existing write-once optical discs, this information is named variously. For example, in the case of CD series, this information is named a track information; in the case of DVD series, this information is named an RZone or a fragment.

Accordingly, there is an increasing demand for a method of efficiently recording the management information corresponding to the recording status of the high-density optical disc. And this method must be provided with the standardized information in order to secure mutual compatibility. In addition, there is a demand for a method of recording the management information on a disc, which can be applied to a write-once high-density optical disc performing defect management, as well as to the Blu-ray discs.

SUMMARY OF THE INVENTION

Accordingly, the present invention is directed to an optical disc and a method and apparatus for recording disc management information, and particularly to a method and apparatus for efficiently managing the disc recording status information, which substantially obviate one or more problems due to limitations and disadvantages of the related art.

An object of the present invention is to provide a method and apparatus for defining types of sequential recording ranges (SRRs) and recording information on the SRRs in an SRR information (SRRI).

Another object of the present invention is to provide a method and apparatus for recording SRRI as disc recording status information that can be applied to a write-once optical disc on which physical defect management is performed, and to provide a method and apparatus for recovering a damaged SRRI from a write-once optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6C illustrates an example of a structure of a list of opened SRRs field of an SRRI according to the present invention;

FIGS. 13A and 13B illustrate a method of restoring the latest SRRI in the write-once optical disc according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

For the convenience of description, a write-once Blu-ray disc (BD-WO) is described for example. Most of the terminologies in this specification are widespread general words but there are some words selected and used by the inventor, the meaning of which will be described in detail in the corresponding description. The present invention should be understood not based on the simple meanings of the words but based on the specifically described meanings of the words, if such meanings have been discussed.

Figure 12:
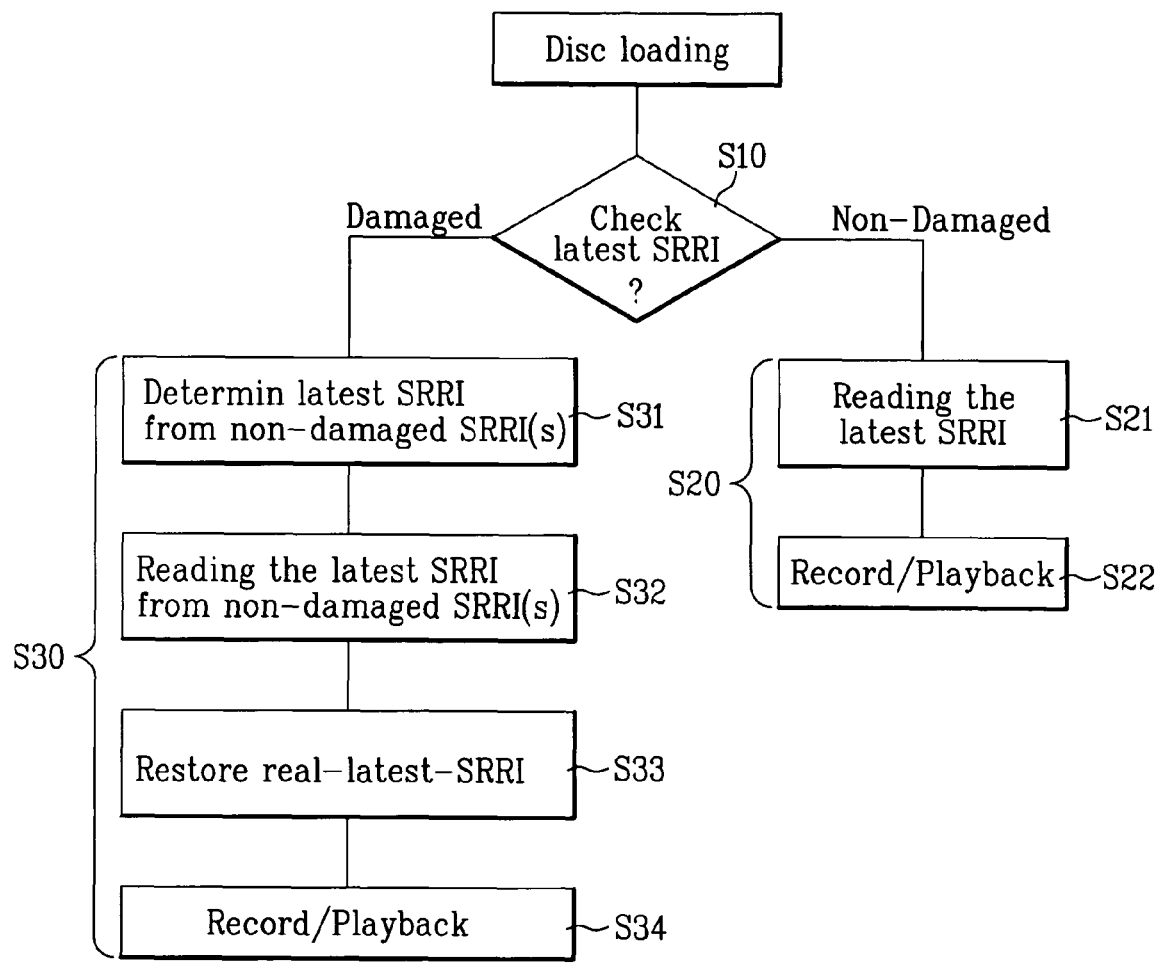
FIG. 12 is a flowchart illustrating a method of using SRRIs of a write-once optical disc when the latest SRRI is damaged according to an embodiment of the present invention.

When a plurality of areas are formed on a disc and the areas are recorded sequentially, each of these areas is called a "sequential recording range" (SRR). An SRR is a unit of recording (sequential recording-unit) for sequential recording user data. An SRR has a size of one or more clusters. "SRR information" (SRRI) is a name for information identifying a recording status of a disc. SRRI is applied to a sequential recording mode of the disc and pertains to one or more SRRs. "Padding" means filling an unrecorded area in an SRR with dummy data or zeros at a user's request or under control of a recording/playback apparatus (FIG. 12). "Session" is composed of one or more consecutive SRRs and identifies SRRs for compatibility to the specification only for playbacks.

Figure 1:
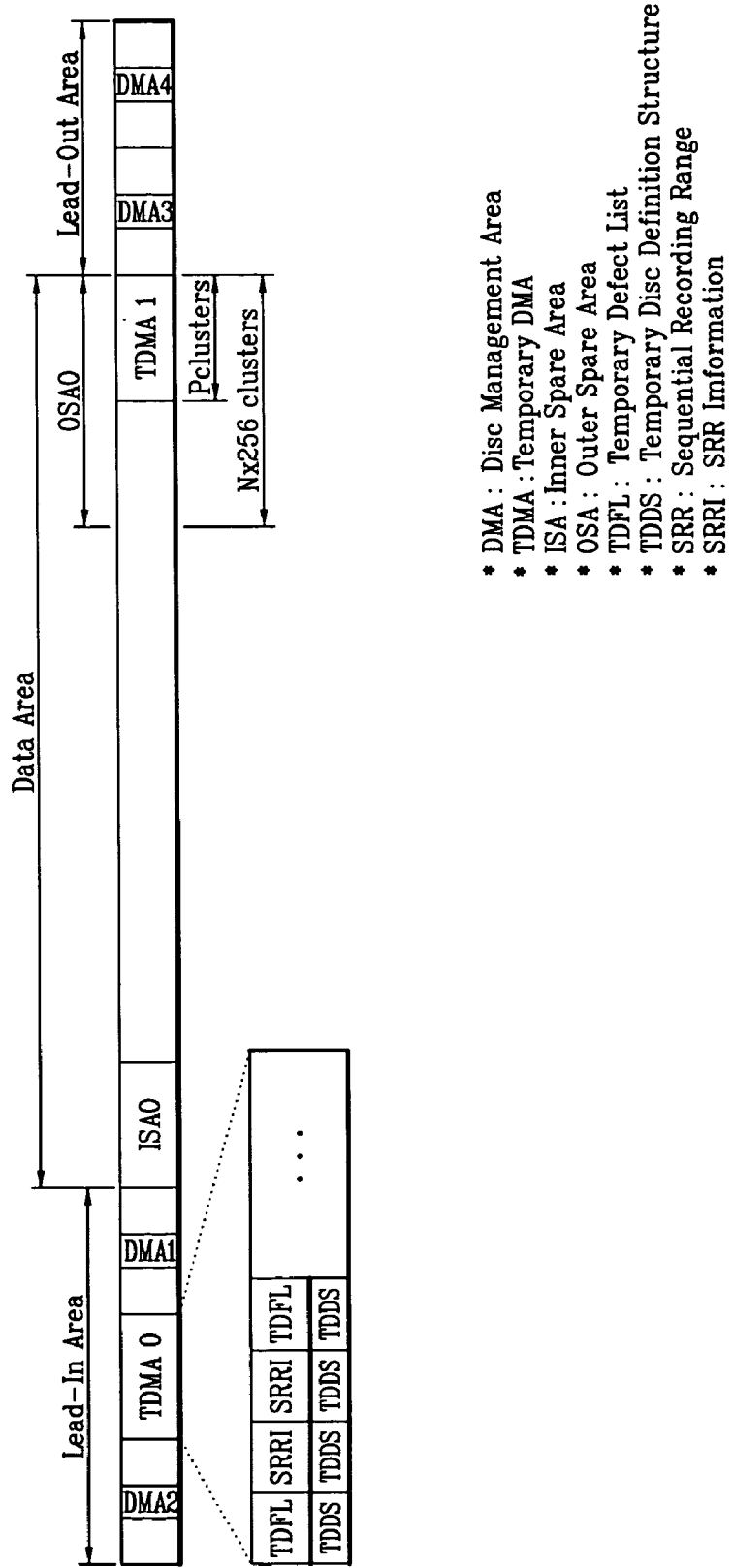
FIG. 1 illustrates an overall structure of a write-once optical disc and a method for recording management information on the write-once optical disc according to the present invention.

FIG. 1 illustrates a structure of a write-once optical disc such as a BD-WO and a method for recording disc management information according to the present invention. The disc shown in FIG. 1 has a single recording layer as an example. But the present invention is not limited to such, and is applicable to a disc having dual or multiple recording layers.

Referring to FIG. 1, the disc includes a lead-in area, a data area, and a lead-out area, all at the recording layer. The lead-in and lead-out areas have a plurality of disc (or defect) management areas (DMA1-DMA4) for storing the same defect management information repeatedly. In the data area, an inner spare area ISA0 and/or an outer spare area OSA0 for replacing defective areas is provided.

It is known that a rewritable optical disc does not have or need a large DMA since its DMA can be written and erased repeatedly, even if the disc has the DMA of a limited size. This is not the case for a write-once optical disc such as a BD-WO. Since the write-once optical disc cannot be re-recorded on the area that was recorded once, the write-once optical disc needs and has a larger management area. To more effectively store management information, in the write-once optical disc the management information is temporarily stored in a temporary disc management area (TDMA). When the disc is ready to be finalized/closed, then the management information stored in a final/latest TDMA is transferred to a DMA for more permanent storage.

As shown in FIG. 1, the disc includes two TDMAs: TDMA0 and TDMA1. The TDMA0 is allocated to the lead-in area and has a fixed, non-variable size. The TDMA1 is allocated to the outer spare area OSA0 and has a size variable in accordance with the size of the spare area. The size P of the TDMA1 may be, for example, P=(N*256)/4 clusters where N is a positive integer, which is about one fourth of the size of the entire outer spare area OSA0.

In each of the TDMA0 and TDMA1, temporary defect list (TDFL) information and temporary disc definition structure (TDDS) information together (TDFL+TDDS) can be recorded in one recording-unit (e.g., one cluster in the case of a BD-WO), or SRRI and TDDS information together (SRRI+TDDS) can be recorded in one recording-unit as shown. The SRRI is recorded when a sequential recording mode is used, whereas SBM (space bit map) is used when a random recording mode is used.

At each update time, (TDFL+TDDS) or (SRRI+TDDS) are recorded to the TDMA in the size of one cluster. In the example of FIG. 1, a TDFL and a TDDS are recorded in one cluster of the TDMA0, an SRRI and a TDDS are recorded in the next cluster of the TDMA0, an SRRI and a TDDS are recorded in the next cluster of the TDMA0, and so on.

If a defective area occurs within the data area, a process of replacing it with the spare area is carried out. The TDFL is the information that manages this process as the defect list. In the case of a single layer disc, the TDFL is recorded with the size of 1 cluster to 4 clusters according to the size of the defect list. SRRI is information informing of whether a specific area of the disc is recorded or unrecorded. The SRRI can be widely used when the disc is of a consecutive recording type. That is, the SRRI can be usefully applied to the case where the disc is recorded in a sequential or incremental recording mode. In addition, the TDDS information is generally recorded on the last sector among the 32 sectors within one cluster of the management area. Information for general management and defect management of the disc is recorded as part of the TDDS information, and the TDDS information is generally always recorded last when the management information is updated within the TDMA.

The present invention relates to a method of generating and recording disc recording status information, which is applied to a new high density optical disc such as a BD-WO. In the present invention, SRRI is used as the disc recording status information, and various types of SRRs are defined as shown in FIGS. 2A through 3E. The detailed structure of SRRI will be described referring to FIGS. 5A through 6C. The present invention also defines and distinguishes different types of SRRs formed on the disc and uses them to record and playback the optical disc. A method of newly defining the types of the SRRs and creating information identifying the types of distinguished SRRs will be described in detail.

FIGS. 2A to 2D illustrate different types of opened SRRs for the write-once optical disc (e.g., a BD-WO) according to the present invention. An opened SRR is an SRR in which data can be recorded. If the SRR is recordable, the SRR has "next writable address" (NWA). Accordingly, the opened SRR is the SRR having the NWA. The SRR that does not have the NWA and is not recordable is called a closed SRR. The closed SRR will be described referring to FIGS. 3A through 3E.

Figure 2A:
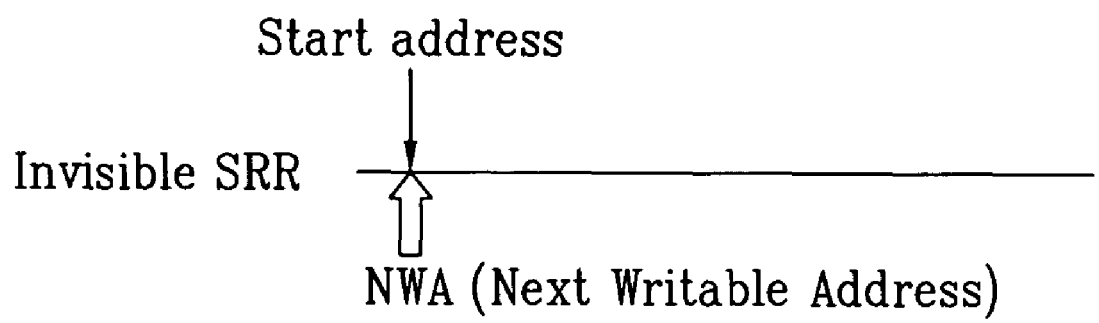
FIGS. 2A through 2D illustrate different types of opened SRRs of a write-once optical disc according to the present invention.

More specifically, FIG. 2A shows an invisible SRR that is one type of an opened SRR. The invisible SRR is generally always formed on an outermost section of a disc or an initial black disc and means an unrecorded area. In other words, only a start address of the invisible SRR is defined and an end address of the invisible SRR means an end of user data. Since data is not yet recorded, "last recorded area" (LRA) has a zero value and the NWA has the same value as the start address of the invisible SRR.

Figure 2B:
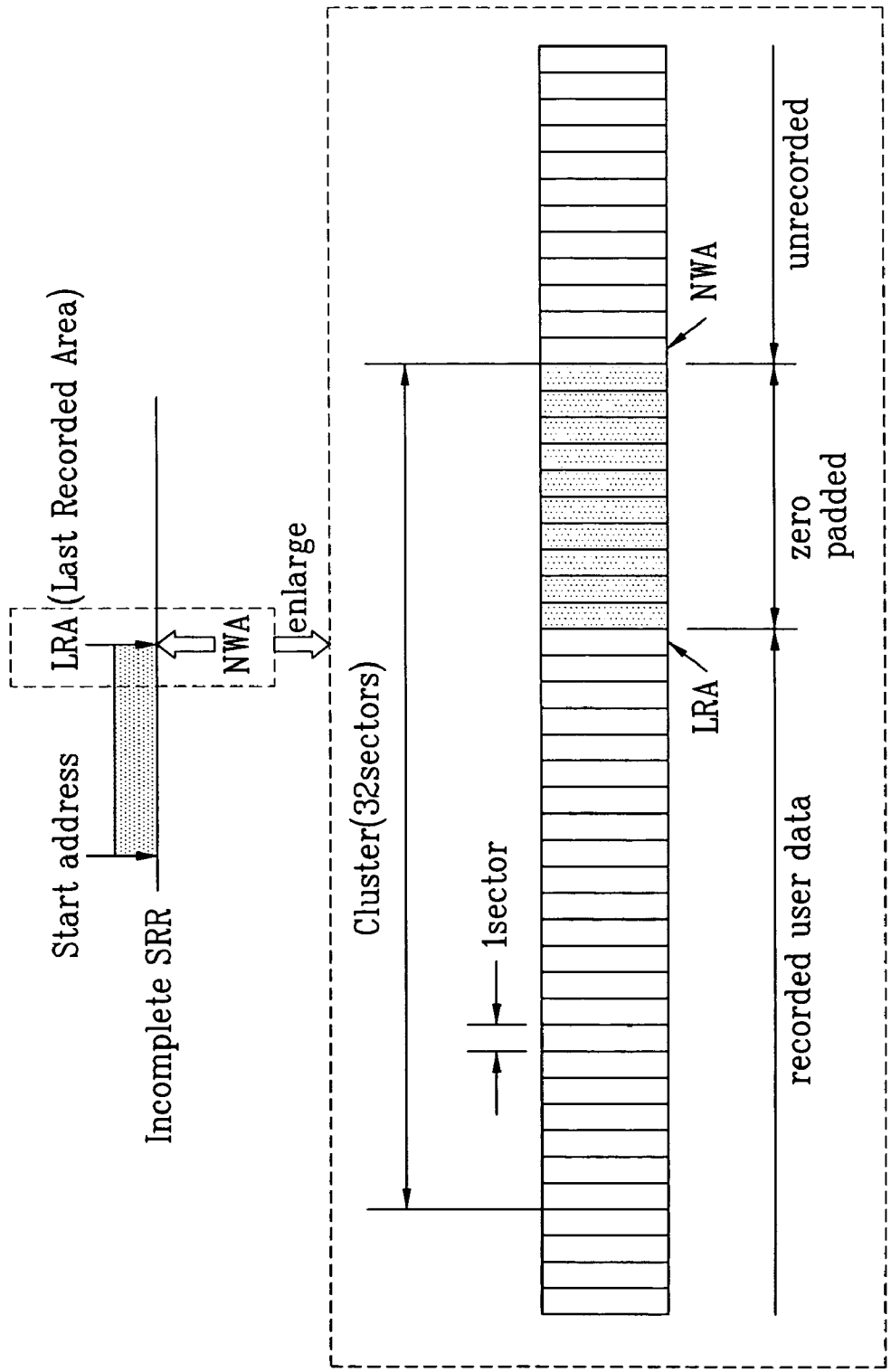

FIG. 2B shows an incomplete SRR that is another type of an opened SRR. The incomplete SRR is an SRR that is partially recorded in the invisible SRR of FIG. 2A. In other words, only a start address of the incomplete SRR is defined and an end address of the incomplete SRR means an end of user data. However, since data is partially recorded in the incomplete SRR, the LRA of the incomplete SRR represents the last address at which normal user data is recorded and the NWA is the next address from the LRA of the incomplete SRR. That is, the NWA is the first PSN of the next available unrecorded cluster in the related SRR.

In the opened SRR, if the SRR is partially recorded, the relation between the LRA and the NWA will be now described in detail in relation with padding shown in FIG. 2B. The enlarged view of the small dotted box portion in FIG. 2B is provided at a lower portion of the drawing.

In other words, LRA means the area in which user data are actually recorded. If the user data are recorded on some sectors in one cluster consisting of thirty-two sectors, the physical sector number (PSN) of the corresponding sector on which the user data are recorded is the LRA of the SRR as shown in FIG. 2B. However, since the basic recording-unit of the Blu-ray disc is a cluster, NWA representing an additionally recordable area will be the PSN of a header sector of the following cluster. Accordingly, if data is recorded on some sectors of the cluster and recording is finished (i.e., the sequential recording is terminated), the remaining unrecorded sectors are padded with dummy data according to the present invention. For instance, the remaining unrecorded sectors of the cluster are padded with zeros as shown. If all the user data are recorded on even the last sector of the cluster, it is obvious that the padding described is not necessary.

Figure 2C:
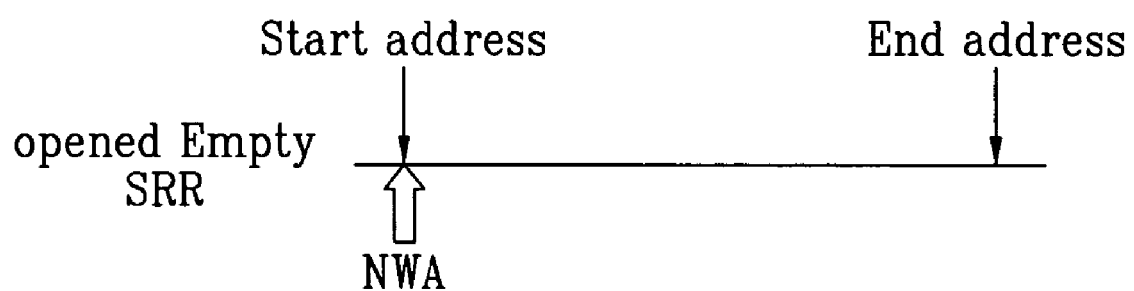

FIG. 2C shows an empty SRR that is yet another type of an opened SRR. The empty SRR is formed generally not at an outermost section of the disc, but is formed generally at a middle section to record data in contrast to the invisible SRR and the incomplete SRR of FIGS. 2A and 2B. In other words, it is the case where a host or user makes an SRR, but does not yet record data on the SRR. Since the empty SRR has a start address and an end address but is not yet recorded, the LRA of the empty SRR has a "zero" value and the NWA has the same value as the start address of the empty SRR.

Figure 2D:
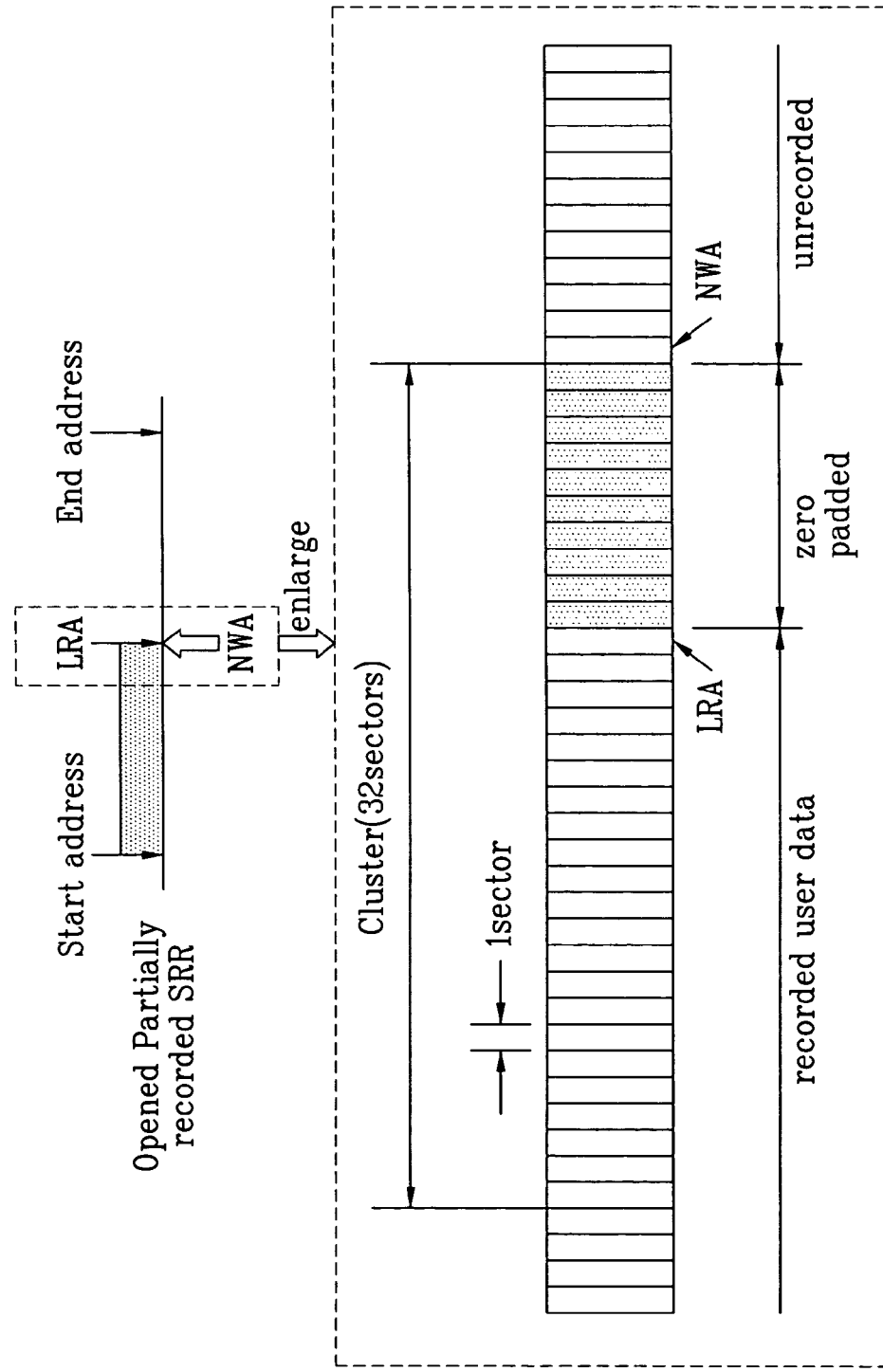

FIG. 2D shows a partially recorded SRR that is yet another type of an opened SRR. The partially recorded SRR is an SRR that is partially recorded in the empty SRR of FIG. 2C. Accordingly, the partially recorded SRR has a start address and an end address. Since data is partially recorded in the partially recorded SRR, the LRA of the partially recorded SRR represents the last address at which normal data is recorded and the NWA is the next writable address from the LRA.

In the opened SRR of FIG. 2D, if the SRR is partially recorded, the enlarged view of the small dotted portion in FIG. 2D shows the relation between the LRA and NWA in relation with padding. The detailed description on this feature is omitted since it is the same as the description of FIG. 2B.

Accordingly, referring to FIGS. 2A through 2D, the opened SRRs of the present invention are classified into the unrecorded opened SRRs (FIGS. 2A and 2C) and the partially recorded opened SRRs (FIGS. 2B and 2D). The partially recorded opened SRRs (FIGS. 2B and 2D) can be classified into an opened SRR padded after the LRA, and an unpadded opened SRR.

According to the present invention, the total number of opened SRRs at any given time is limited to a predetermined number in the write-once optical disc due to a difficulty in management if the number of opened SRRs is large. For example, the total number of the opened SRRs on the disc may be sixteen at most in the BD-WO of the present invention. The information on the location and the number of the opened SRRs can be referred to using a "list of opened SRRs" field and a "number of opened SRRs" field in a header of the SRRI. The "list of opened SRRs" field and the "number of opened SRRs" field in the SRRI header will be described later when the SRRI structure is discussed referring to FIGS. 5 through 6C.

FIGS. 3A to 3E illustrate different types of closed SRRs for a write-once optical disc such as a BD-WO according to the present invention. A closed SRR is an SRR in which data (e.g., user data) cannot be recorded. If the SRR is not recordable, the SRR does not have a NWA. The closed SRR may be created because the SRR is fully recorded. Also, the closed SRR may be created because a user or host closes the SRR by a close command even though a recordable area remains in the SRR.

Figure 3A:
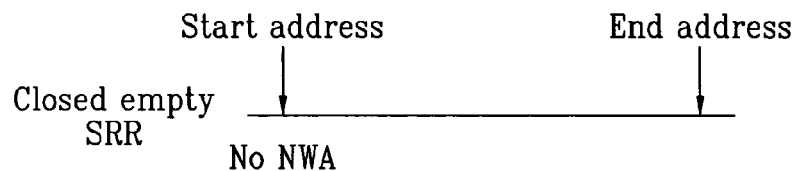
FIGS. 3A through 3E illustrate different types of closed SRRs of a write-once optical disc according to the present invention.

Particularly, FIG. 3A shows an empty SRR that is one type of a closed SRR. The empty SRR is an opened empty SRR (FIG. 2C) that is closed by a close command without any user-data recording thereto. Accordingly, FIG. 3A shows a closed empty SRR and FIG. 2C shows an opened empty SRR.

Figure 3B:
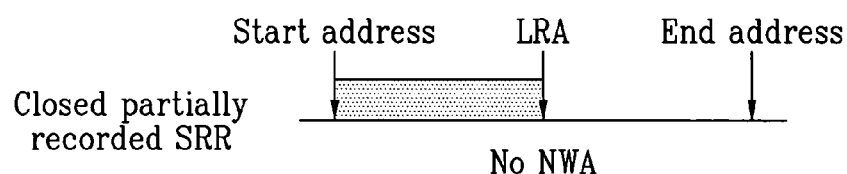

FIG. 3B shows a partially recorded SRR that is another type of a closed SRR. The partially recorded SRR of FIG. 3B is the opened partially recorded SRR of FIG. 2D that is closed by a close command without any additional user-data recording thereto. Accordingly, FIG. 3B shows a closed partially recorded SRR and FIG. 2D shows an opened partially recorded SRR.

Figure 3C:
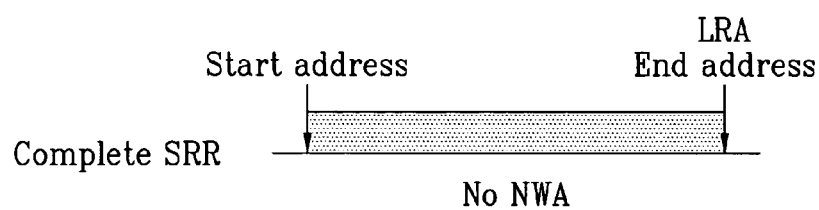

FIG. 3C shows a complete SRR that is yet another type of a closed SRR. The complete SRR is an SRR in which user data are recorded fully in the SRR, or which is padded fully with dummy data. The complete SRR exists only among the closed SRRs.

Figure 3D:
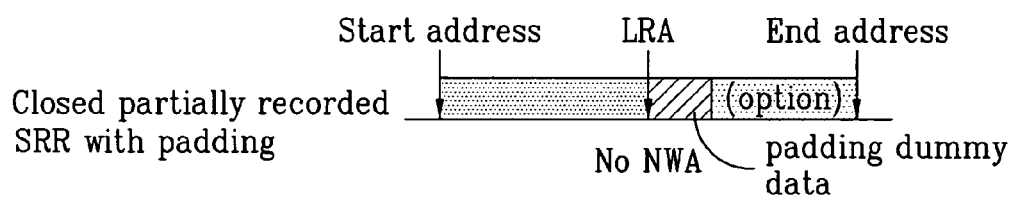

FIG. 3D shows a closed partially recorded SRR that is yet another type of a closed SRR. The partially recorded SRR of FIG. 3D is an SRR that is padded with dummy data in a recordable area after its LRA when closing the opened partially recorded SRR of FIG. 2D. Herein, all the recordable areas or only some recordable areas (for example, one or more clusters) of the SRR after its LRA or NWA may be padded with dummy data used as padding data. In addition, when some areas are padded, a specific character code such as ASCII characters may be recorded as the padding data, instead of recording the dummy data so as to represent that the SRR is closed. In this case, the specific character code to be used as the padding data can be characters such as "CLSD" representing that a corresponding SRR is closed.

Figure 3E:
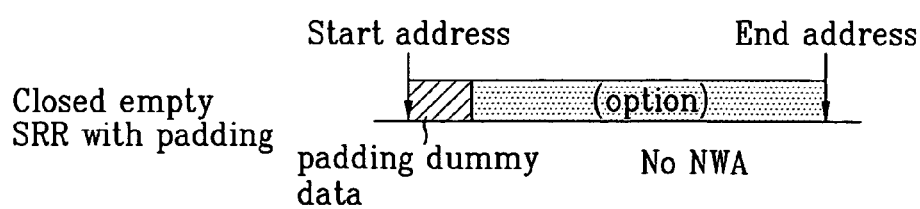

FIG. 3E shows an empty SRR that is another type of a closed SRR. The empty SRR of FIG. 3E is an SRR that is padded with specific dummy data in a recordable area after its LRA and then closed when closing the opened empty SRR of FIG. 2C. Herein, all the recordable areas or only some recordable area (for example, one or more clusters) of the SRR after its LRA or NWA may be padded with dummy data used as padding data. In addition, when some areas are padded, a specific character code such as ASCII characters may be recorded as the padding data, instead of recording the dummy data so as to represent that the SRR is closed. In this case, the specific character code to be used as the padding data can be characters such as "CLSD" representing that a corresponding SRR is closed.

If the closed SRRs of FIGS. 3D and 3E are fully padded with dummy data up to the end address, the closed SRRs of FIGS. 3D and 3E are the same SRRs as the complete SRR described above referring to FIG. 3C. In other words, in the present invention, in determining the type of the closed SRR, the closed SRRs are defined to distinguish the case of closing the unrecorded remaining area(s) of the SRR without padding (FIGS. 3A and 3B) from the case of padding and closing the unrecorded remaining area(s) of the SRR (FIGS. 3D and 3E) when the opened SRR is changed into the closed SRR by a close command.

Figure 4A:
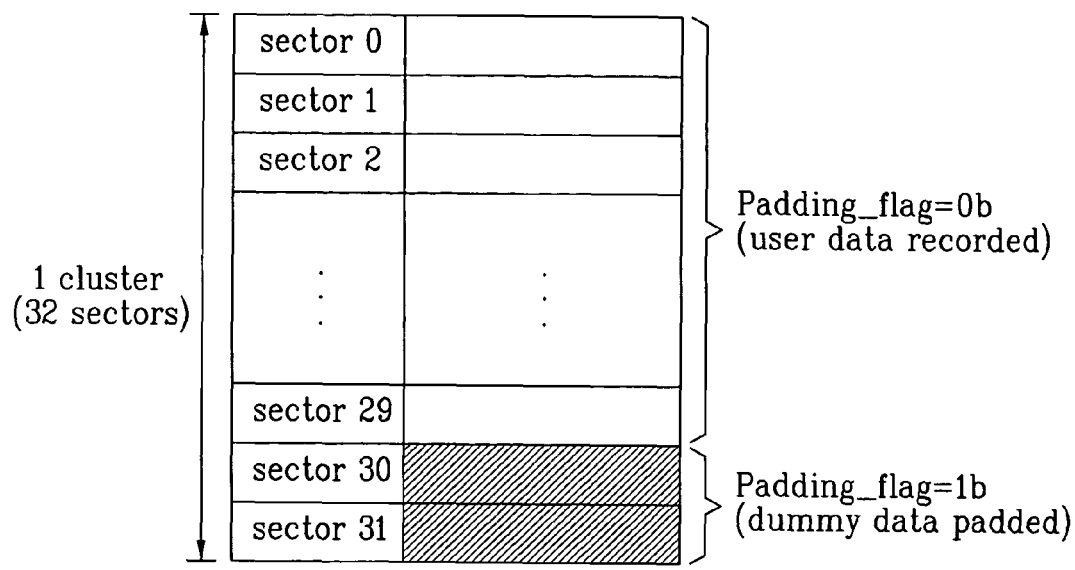
FIG. 4A illustrates an example of padding identification information when padding dummy data to a closed SRR of a write-once optical disc according to the present invention.
Figure 4B:
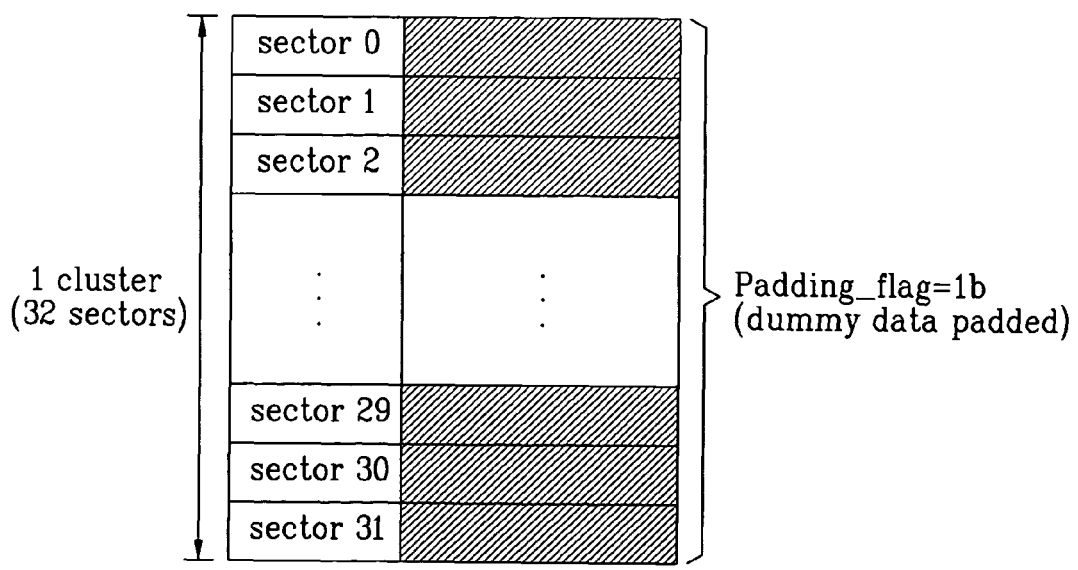
FIG. 4B illustrates an example of padding identification information when padding dummy data to an opened SRR of a write-once optical disc according to the present invention.
Figure 14:
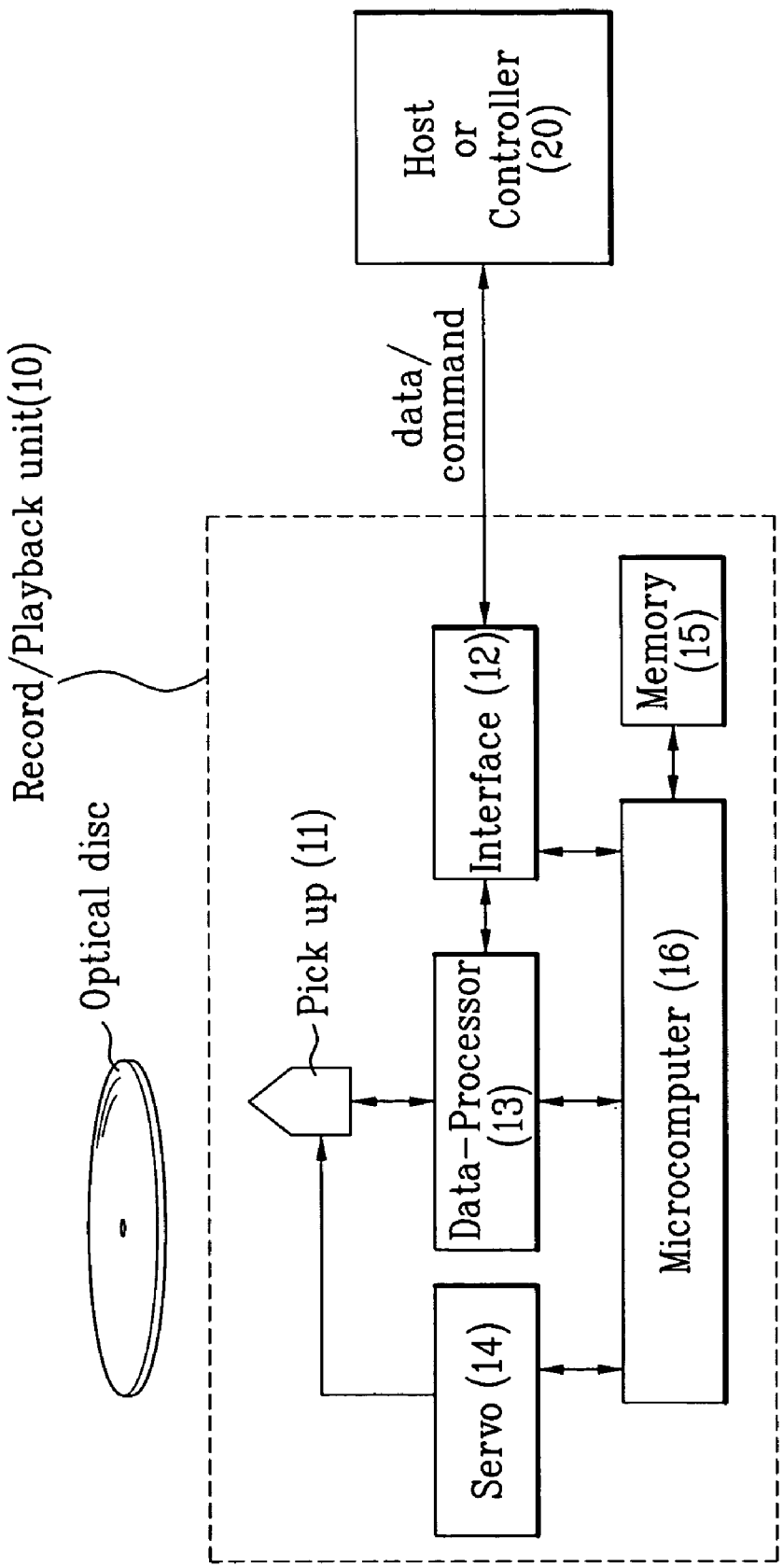
FIG. 14 illustrates a recording/playback apparatus for a write-once optical disc according to an embodiment of the present invention.

Additionally, in the present invention, when closing an SRR, it is possible to close the SRR without padding or to close the SRR after padding with specific padding data. It is considered that the Blu-ray disc is compatible to a disc only for playback in the same family though SRRs or if unrecorded areas are padded. A recording/playback apparatus (e.g., as shown in FIG. 14) can selectively pad the disc so that the freedom of the design of the recording/playback apparatus is further ensured. When padding the disc, a recording/playback part (e.g., the component 10 in FIG. 14) of the recording/playback apparatus can automatically record specific data, so that the component 10 receives specific data from a controller and can solve the time problem in the case of padding FIGS. 4A and 4B illustrate examples of padding identification information when padding dummy data respectively to a closed recorded SRR and an opened SRR of a write-once optical disc according to an embodiment of the present invention. The padding may be performed to an opened SRR when closing the opened SRR. But, it can also be performed to an opened SRR in response to a command not necessarily to close the SRR (e.g., in the cases of FIGS. 2B and 2D where padding is performed for terminating the sequential recording). That is, FIG. 4A is related to FIG. 2B or 2D, and FIG. 4B is related to FIG. 3D or 3E.

More specifically, FIG. 4A shows a case where the actual user data is recorded on only some areas of one cluster and the remaining areas of the cluster are padded with dummy data in the case of an opened SRR. FIG. 4A shows that padding identification information "Padding_flag" for distinguishing a sector in which actual user data is recorded from a sector padded with dummy data is set as control flag in the corresponding cluster. There exist 32 Padding_flags each corresponding to one of the 32 sectors of each cluster of an SRR.

As shown in FIG. 4A, in this example, since sector 0-sector 29 are the areas in which user data are recorded, the Padding_flag for each of these sectors is set to a certain value, e.g., "0b," so as to indicate that no padding is present to the corresponding sector. On the other hand, since sector 30 and sector 31 are the areas padded with padding data, the Padding_flag for each of these sectors is set to a value such as "1b" so as to indicate that padding is present in the corresponding sectors.

In this example, the LRA represents the location (first PSN) of sector 29. Accordingly, the optical recording/playback apparatus can decode a cluster including the LRA, read the Padding_flag corresponding to each of the sectors and then accurately recognize a sector padded with dummy data in the cluster.

FIG. 4B shows that a specific cluster of the recordable areas in an SRR is fully padded with dummy data in the case of closing the SRR. FIG. 4B shows that padding identification information "Padding_flag" for distinguishing an SRR closed without padding from an SRR closed after padding is set as control flag in the corresponding cluster.

As shown in FIG. 4B, in this example, since sector 0-sector 31 are the areas padded fully with dummy data, the Padding_flag for each of these 32 sectors is set to a certain value such as "1b", to indicate that the corresponding sectors are padded. Consequently, the optical recording/playback apparatus can decode a cluster having the padding identification information (Padding_flag) as describe above, read the Padding_flag corresponding to each of the sectors and then accurately recognize that all the sectors in the cluster are padded with dummy data.

In other words, FIG. 4A relates to padding for terminating the sequential recording on the disc whereas FIG. 4B relates to padding for closing an SRR. FIG. 4A shows that all the remaining sectors in the related cluster are padded with dummy data when the sequential recording is terminated. Each padding flag corresponds to each sector of the cluster, and is set to "1b" if the corresponding sector is padded. In the case of FIG. 4A, padding occurs one sector at a time. On the other hand, in the case of FIG. 4B, one or more clusters (one cluster at a time) are padded when closing the SRR. For one cluster padding, 32 padding flags corresponding to 32 sectors of that cluster are all set to "1b" to indicate the padding of that cluster as shown in FIG. 4B.

Figure 5:
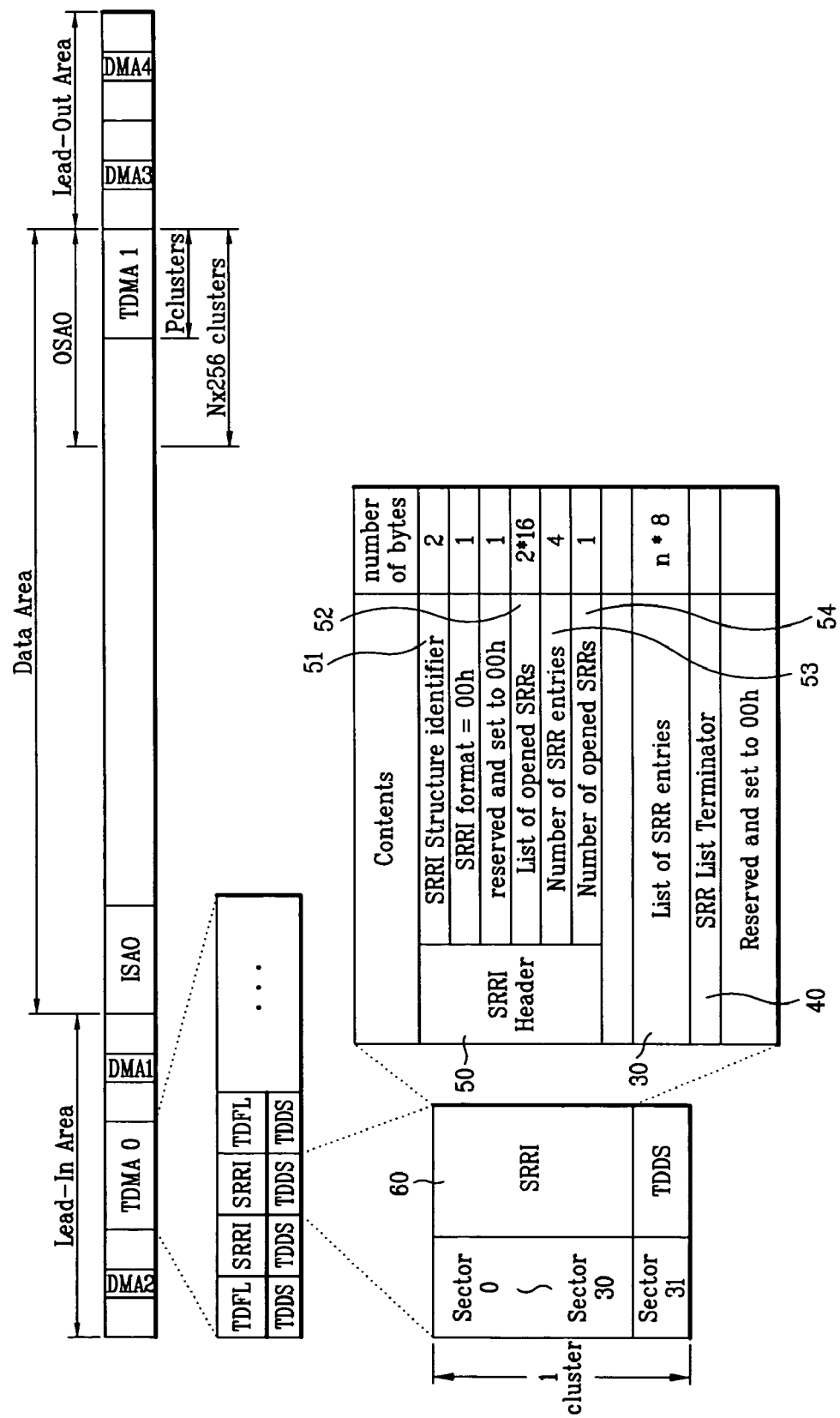
FIG. 5 illustrates an overall structure of a write-once optical disc and a method for recording SRRI as disc management information according to the present invention.

FIGS. 5 through 6C illustrate a structure of SRRI and information included in the SRRI according to the present invention.

Particularly, FIG. 5 illustrates the overall structure of an SRRI. The SRRI pertains to one or more SRRs and is management information providing disc recording status. The SRRIs are recorded in TDMA(s) (e.g., the TDMA0) in the optical disc structure of FIGS. 1 and 5. As shown in FIG. 5, each SRRI 60 in a TDMA is composed of three parts: a header 50, a list of SRR entries 30 and an SRR list terminator 40. The header 50 identifies the SRRI. The list of SRR entries 30 represents the recording status of each of the corresponding SRRs. The SRR list terminator 40 represents an end or termination of the SRRI.

The header 50 is located at a header in the SRRI and includes an "SRRI structure identifier" field 51, a "List of opened SRRs" field 52, a "Number of SRR entries" field 53 and a "Number of opened SRRs" field 54, so that the overall SRR entry contents can be checked before the SRR entry list is read. Herein, the "SRRI structure identifier" field 51 identifies the SRRI. The "List of opened SRRs" field 52 informs of the location (identification) of the opened SRRs associated with the corresponding SRRI and will be described later in more detail referring to FIG. 6C. The "Number of SRR entries" field 53 represents the total number of all SRRs associated with the SRRI 60. The "Number of opened SRRs" field 54 represents the total number of opened SRRs.

After the header 50, the list of SRR entries (or the SRR entry list) 50 is recorded in the SRRI. After the last SRR entry, the end of the SRRI is marked with the SRR list terminator 40. The SRR list terminator 40 is meaningful as information indicating an end location of the corresponding SRRI if the SRRI has a variable size.

Accordingly, as disc management information, the SRRI is composed of the header 50, the SRR entry list 30 and the SRR list terminator 40. All such information is recorded in batch whenever it is updated.

Figure 6A:
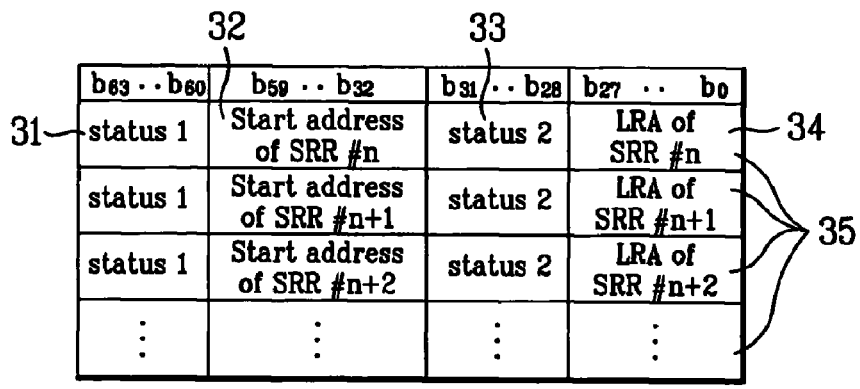
FIG. 6A illustrates a structure of an SRR entry list recorded in an SRRI according to the present invention.

FIG. 6A illustrates an example of the SRR entry list 30 recorded in an SRRI according to the present invention. As shown in FIG. 6A, the SRR entry list 30 is composed of one or more SRR entries 35. Each of the SRR entries 35 carries information on one SRR (identified by the SRR number) on the disc, has a size of eight bytes (64 bits) and represents the recording status of the corresponding SRR. Each SRR entry 35 includes a status field 31 (Status 1) for storing the status of the corresponding SRR, a start address field 32 for storing a start address of the corresponding SRR, another status field 33 (Status 2) for storing the status of the corresponding SRR, and a last recorded address (LRA) field 34 for storing the LRA of the corresponding SRR (i.e., the end address of the user data stored in the SRR). Generally, the start address of the corresponding SRR in the start address field 32 is represented as a physical sector number (PSN).

According to an embodiment, the first 4 most significant bits (b63-b60) among the 64 bits of the SRR entry 35 are allocated to the first status field 31, the next 28 bits (b59-b32) of the SRR entry 35 are allocated to the start address field 32, the next 4 bits (b31-b28) of the SRR entry 35 are allocated to the second status field 33, and the last 28 bits (b27-b0) of the SRR entry 35 are allocated to the LRA field 34.

Figure 6B:
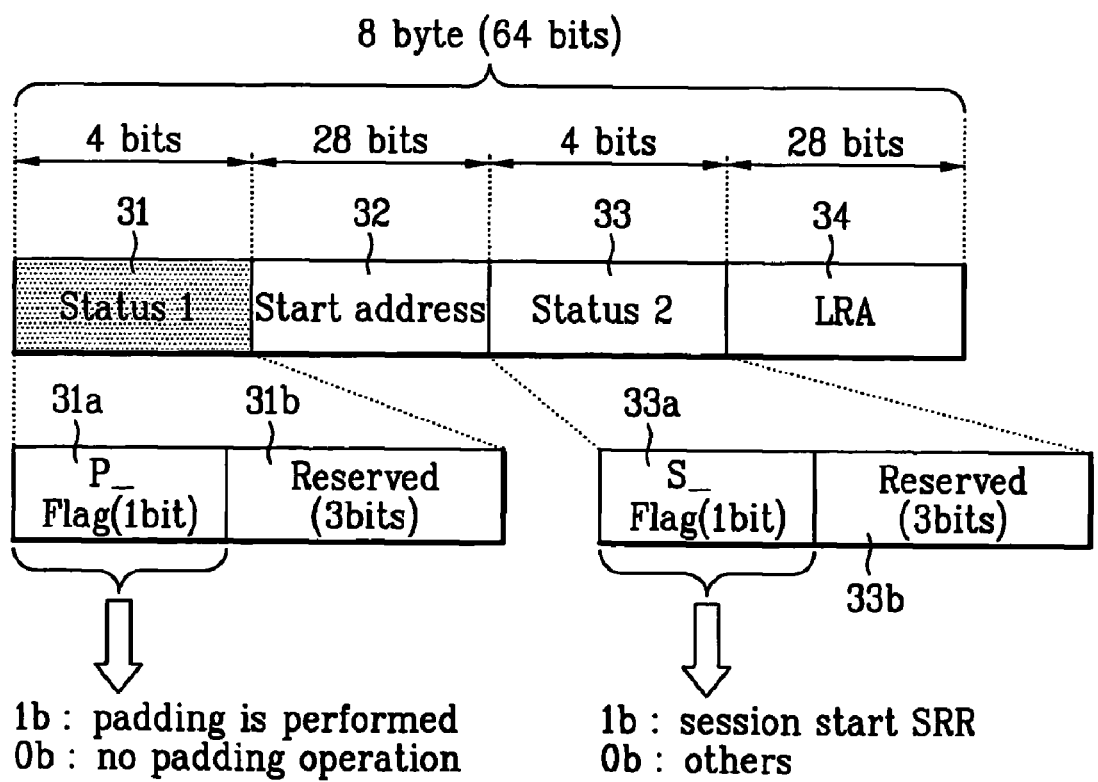
FIG. 6B illustrates an example of an SRR entry recorded in the SRR entry list of FIG. 6A according to the present invention.

FIG. 6B illustrates an example of the SRR entry 35 recorded in the SRR entry list 30 according to the present invention. The Status 1 field 31 is used to store information identifying whether or not any padding is performed in the corresponding SRR. The Status 2 field 33 is used to store information identifying whether or not the corresponding SRR is the start of a session.

As shown in FIG. 6B, out of the 4 heading bits allocated to the Status 1 field 31, one bit is used to store a padding identification information "P_flag" identifying whether or not the SRR has been padded with padding data. The other three bits of the 4 heading bits are reserved for any change of regulation.

It should be noted that the padding identification information "P_flag" recorded in the SRR entry is similar to the padding identification information "Padding_flag" described referring to FIGS. 4A and 4B. However, they have different objects. If a specific SRR is finally padded, the P_flag is recorded in the SRR entry to directly represent that the corresponding SRR is a padded SRR. Accordingly, the optical recording/playback apparatus (FIG. 12) can easily check whether or not the corresponding SRR is padded by examining the P_flag recorded as management information in the SRR entry. After that, the optical recording/playback apparatus decodes the corresponding cluster (SRR) described above referring to FIGS. 4A and 4B and reads from the cluster the value of the Padding_flag corresponding to each sector of the SRR, so that the optical recording/playback apparatus is able to determine how much of the SRR is padded after its LRA.

In the example of FIG. 6B, the first bit (31*a*) of the Status 1 field 31 carries the P-flag and the remaining 3 bits (31*b*) of the field 31 are reserved. If P_flag=1b, it means that the corresponding SRR is a padded SRR (i.e., the SRR has at least some portion that is padded with padding data). If P_flag=0b, it means that the corresponding SRR is an unpadded SRR.

The Status 2 field 33, which is allocated with 4 bits, carries information on whether or not the corresponding SRR is the session start SRR. One bit of the four-bit field 33 carries a session identification information "S_flag" identifying whether or not the corresponding SRR is a start SRR of a session. The other three bits of the field 33 are reserved for any change of regulation. In the example, the first bit (33*a*) of the four-bit field 33 stores the S-flag and the remaining 3 bits (33*b*) are reserved. If S_flag=1b, it means that the corresponding SRR is a start SRR of a session. If S_flag=0b, it means that the corresponding SRR is not a start SRR of a session.

One reason for identifying a start of a session through the S_flag is to provide compatibility with existing disc structures such as DVDs that allocate additional area (for example, border-in/border-out) to distinguish sessions. However, allocation of the additional area reduces the entire recording capacity of the disc. As such, the present invention overcomes this limitation by providing the session identification information (S_flag) in the SRR entry 35. Accordingly, the session structure of the entire disc can be easily recognized using the session identification information S_flag in the SRR entry 35 without having to allocate additional areas to store such session distinguishing information.

For the convenience of description of the present invention, the P_flag and the S_flag are depicted as separate status information stored in separate status fields of an SRR entry, but they can be stored together in one status field of the SRR entry.

The LRA field 34 of the SRR entry 35 is a field for recording an end address (LRA) of user data recorded in the corresponding SRR and stores an end address of the user data (excluding any padding data) recorded in the corresponding SRR FIG. 6C illustrates a detailed structure of the "List of opened SRRs" field 52 of the SRRI in FIG. 5 according to an embodiment of the present invention. The information stored in the field 52 is used to determine the location/identification of each opened SRR. As shown in FIG. 6C, one or more opened SRR numbers are recoded in the "List of opened SRRs" field 52 as location information of the opened SRRs. Two bytes are allocated to record an opened SRR number identifying a particular SRR.

In the present invention, if there are at most sixteen opened SRRs on the disc, the location (identification) of the corresponding opened SRRs (and thus the opened SRR entries) is recorded through each opened SRR number. Accordingly, when loading an optical disc having the disc structure of the present invention, the recording/playback apparatus can determine the location of recordable areas (NWA) of the disc based on the opened SRR information of the present invention. In other words, the location of the opened SRR on the current disc should be known to record data. Since the information identifying whether a corresponding SRR is an opened SRR or a closed SRR is not provided specifically in the SRR entry, the identification/location of the opened SRR is recorded in the header of the SRRI and can be accessed easily, so that the optical recording/playback apparatus is able to easily read the SRR entry associated with the identified opened SRR.

Accordingly, only the SRR having the SRR number recorded on the "List of opened SRRs" field 52 is additionally recordable as an opened SRR. After that, if the SRR is changed into a closed SRR, the SRR number of the closed SRR is removed from the "List of opened SRRs" field 52 so that it is possible to easily distinguish the opened SRR from the closed SRR.

A method for updating the SRRI representing the disc recording status according to the present invention will be now described. Particularly, a method of opening and closing SRRs and sessions, padding an SRR with dummy data and recording SRRIs will be described referring to FIGS. 7A-11B.

FIGS. 7A through 11B illustrate sequentially a method of recording SRRI according to the disc recording status in the write-once optical disc of the present invention. More specifically, FIGS. 7A through 11B show sequentially how the different types of SRRs (shown in FIGS. 2A through 3E) on the disc are created and how to record the SRRI using the sequential steps performed according a time flow. These methods are implemented on the write-once optical disc such as BD-WO having the SRR, the SRRI and the disc structure as discussed herein in connection with FIGS. 1-6C.

FIG. 7A shows Step 1 in which the entire area of the disc is recordable as an initial black disc and a portion designated by a thick arrow indicates the NWA location. The start location of the disc is the NWA. Herein, only one SRR (SRR #1) exists on the disc. This is the invisible SRR shown in FIG. 2A. Accordingly, a session is in the initial state of the disc wherein only one opened session #1 exists. The disc is a blank disc and the SRRI is not yet recorded on the disc. A session is an upper-level recording-unit compared to the lower-level recording-unit such as an SRR, and includes at least one SRR. A plurality of sessions can be recorded on the disc and such a disc is called a multi-session disc.

Figure 7B:
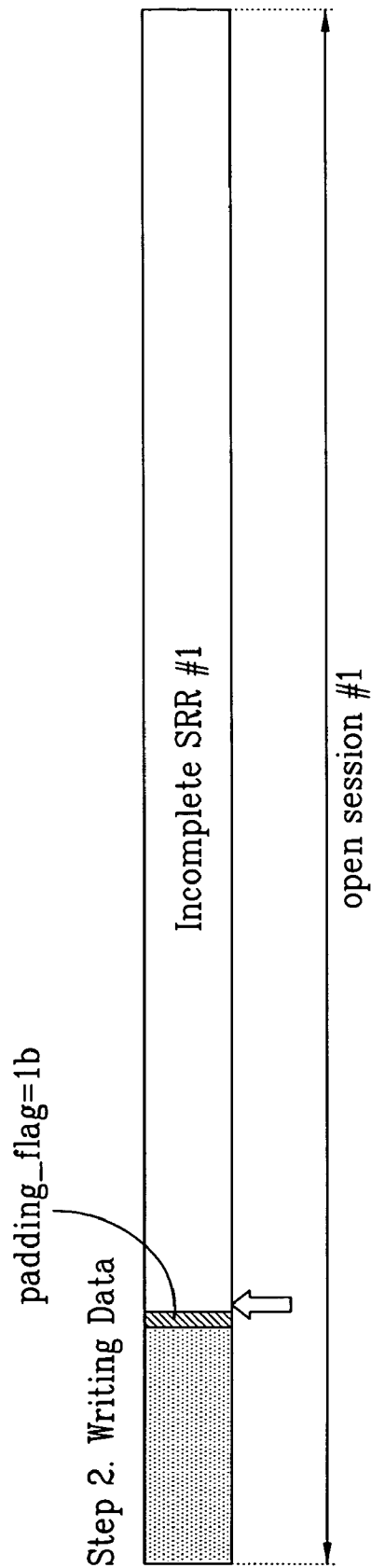
FIGS. 7A through 11B illustrate a process of recording SRRI according to the disc recording status in a write-once optical disc according to the present invention.

FIG. 7B shows Step 2 in which data (e.g., user data) are partially recorded on the blank disc of FIG. 7A, but the session #1 is not yet closed. Herein, only one SRR (SRR #1) exists on the disc, which is the incomplete SRR shown in FIG. 2B. The session #1 is maintained as the opened session. As shown in FIG. 7B, the user data is recorded in a portion of the incomplete SRR #1 and an unrecorded portion (e.g., sector(s)) of the SRR #1 (cluster) is padded with dummy data. As described above, the padded sector of the SRR is indicated with "Padding_flag=1b" which is recorded in a designated area of the cluster, e.g., within the padded sector of the cluster/SRR #1.

Figure 7C:
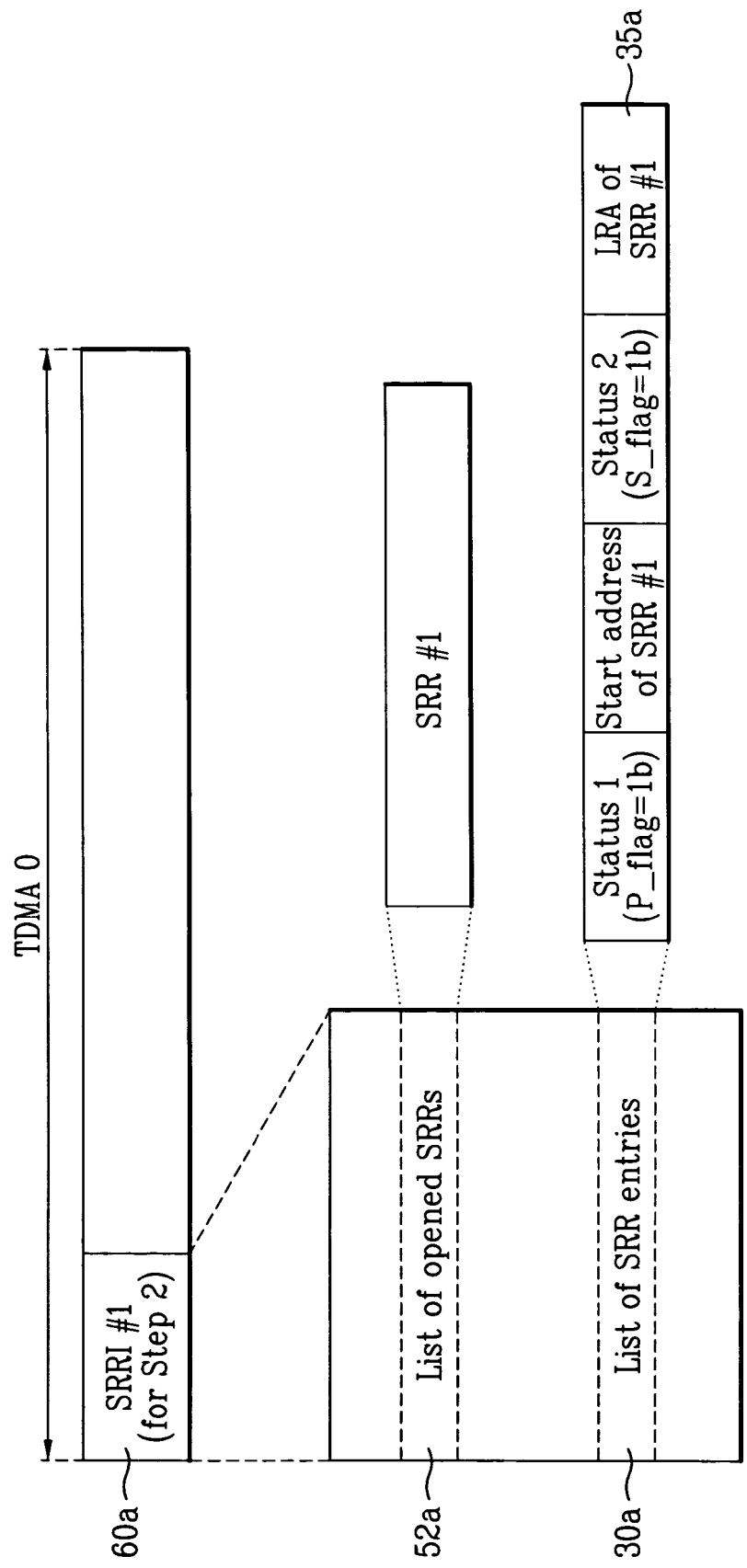

FIG. 7C illustrates a process of recording an SRRI in the management area of the disc when the disc is in the state of FIG. 7B. For the convenience of explanation, only certain portions among all the different components of the disc structure and SRRI structure shown in FIGS. 1 and 5 are shown. For instance, although the (SRRI+TDDS) or (TDFL+TDDS) are recorded in each cluster of the TDMA such as the TDMA0 of the disc as discussed above, only the SRRI is shown in the TDMA0 of FIG. 7C, and the TDFL and/or TDDS is omitted for the sake of clarity. Further, only the "List of opened SRRs" field 52 and the "List of SRR entries" field 30 among the different fields of the SRRI shown in FIG. 5 are shown.

The disc recording status of FIG. 7C is the case where only one opened SRR (SRR #1) is present in all the disc area as in FIG. 7B. As shown in FIG. 7C, when the incomplete SRR #1 is formed without closing the session as in FIG. 7B, the SRRI #1 (60a) pertaining to the SRR #1 is generated and recorded in the TDMA0. In the SRRI #1 (60a), the SRR number (SRR #1) of the opened SRR #1 is recorded in its "List of opened SRRs" field 52a. In the "List of SRR entries" field 30a of the SRRI #1 (60a), only one SRR entry 35a pertaining to the SRR #1 is present. The SRR entry 35a (or SRR entries 35b-35p discussed later) has the SRR entry structure of FIGS. 6A and 6B discussed above.

In the SRR entry 35a, since some portions of the SRR #1 are padded finally, the P_flag is set to "1b" as the status information of the corresponding SRR #1. Since the SRR #1 is the start SRR of the opened session #1, the S_flag is set to "1b" as the status information of the corresponding SRR #1.

Figure 8A:
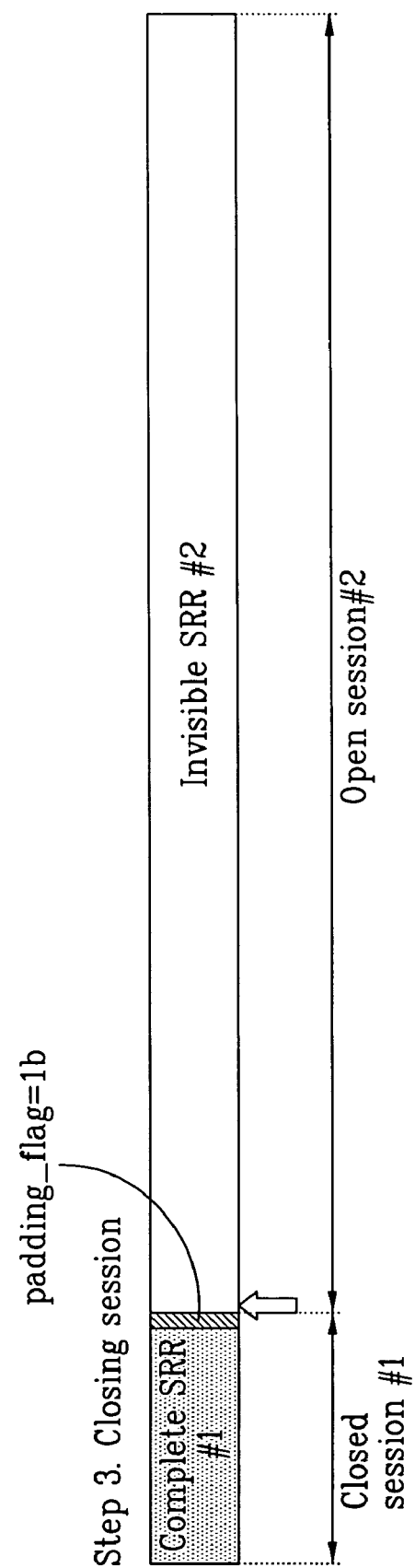

FIG. 8A shows Step 3 in which a session close command is received and executed at Step 2 of FIG. 7B. In response to the session close command, the area on which user data is recorded is separated into an independent closed SRR and a new session is created at the area following the user data recorded area. For instance, as shown in FIG. 8A, the portion of the area that is recorded fully with the user data at Step 2 becomes the complete SRR #1 (closed SRR) which in turn forms the closed session #1. In addition, the unrecorded area becomes an invisible SRR #2 (opened SRR) which in turn forms an opened session #2 at the same time.

Figure 8B:
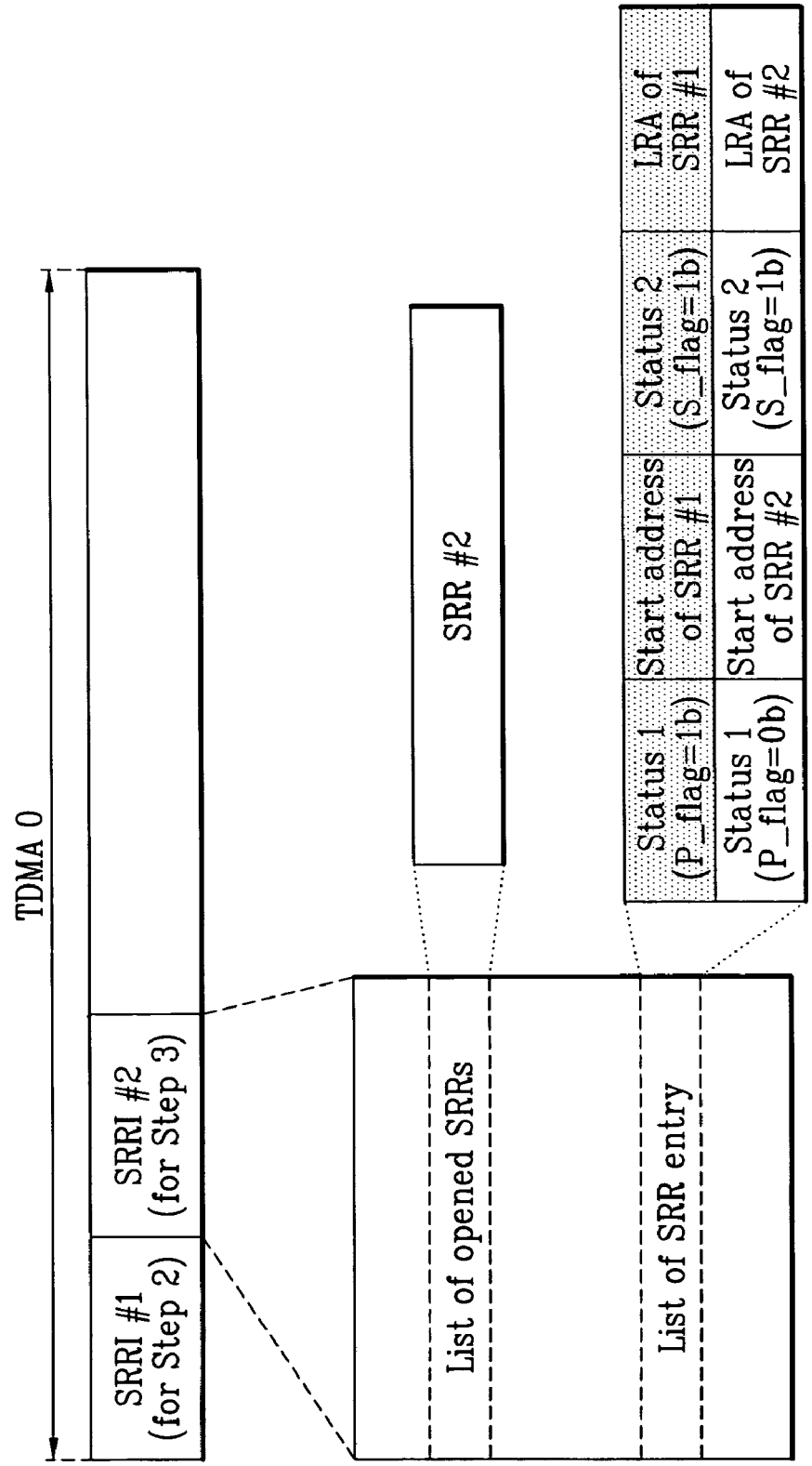

FIG. 8B illustrates a process of recording the disc recording status (SRRI) as it pertains to the disc state as of FIG. 8A. Since the SRRI is a second recorded SRRI, this SRRI is named SRRI #2 (60b). The SRRI #2 (60b) is recorded next to the SRRI #1 (60a) in the TDMA0. For recording the status of the disc of FIG. 8A, since the entire area of the disc has only one opened SRR (SRR #2) and only one closed SRR (SRR #1), the SRR number of the opened SRR #2 is recorded in the "List of opened SRRs" field 52b of the SRRI #2, and information on the SRRs #1 and #2 is recorded in the "List of SRR entries" field 30b of the SRRI #2 respectively as SRR entries 35b and 35c. The SRR entry (e.g., 35b) shadowed in FIG. 8B (and in other figures) indicates that it is a closed SRR entry. Accordingly, since user data is not yet recorded in the newly created SRR #2, the P_flag of the SRR #2 entry (35c) is set to "0b". Since the SRR #2 is the start SRR of the opened session #2, the S_flag of the SRR #2 entry (35c) is set to "1b".

Figure 9A:
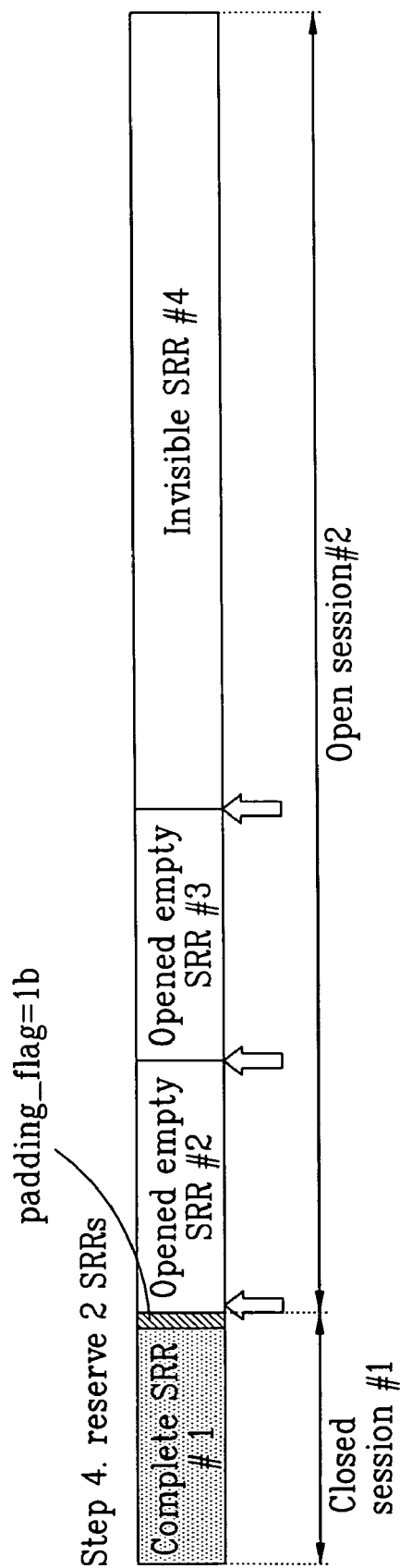

FIG. 9A shows Step 4 in which two opened SRRs are additionally reserved to newly record data when the disc is in the state of FIG. 8A. Accordingly, the newly created opened SRRs are opened empty SRRs #2 and #3 and have NWAs indicated by thick arrows. As a result, the opened session #2 is composed of the empty SRRs #2 and #3 and an invisible SRR #4.

Figure 9B:
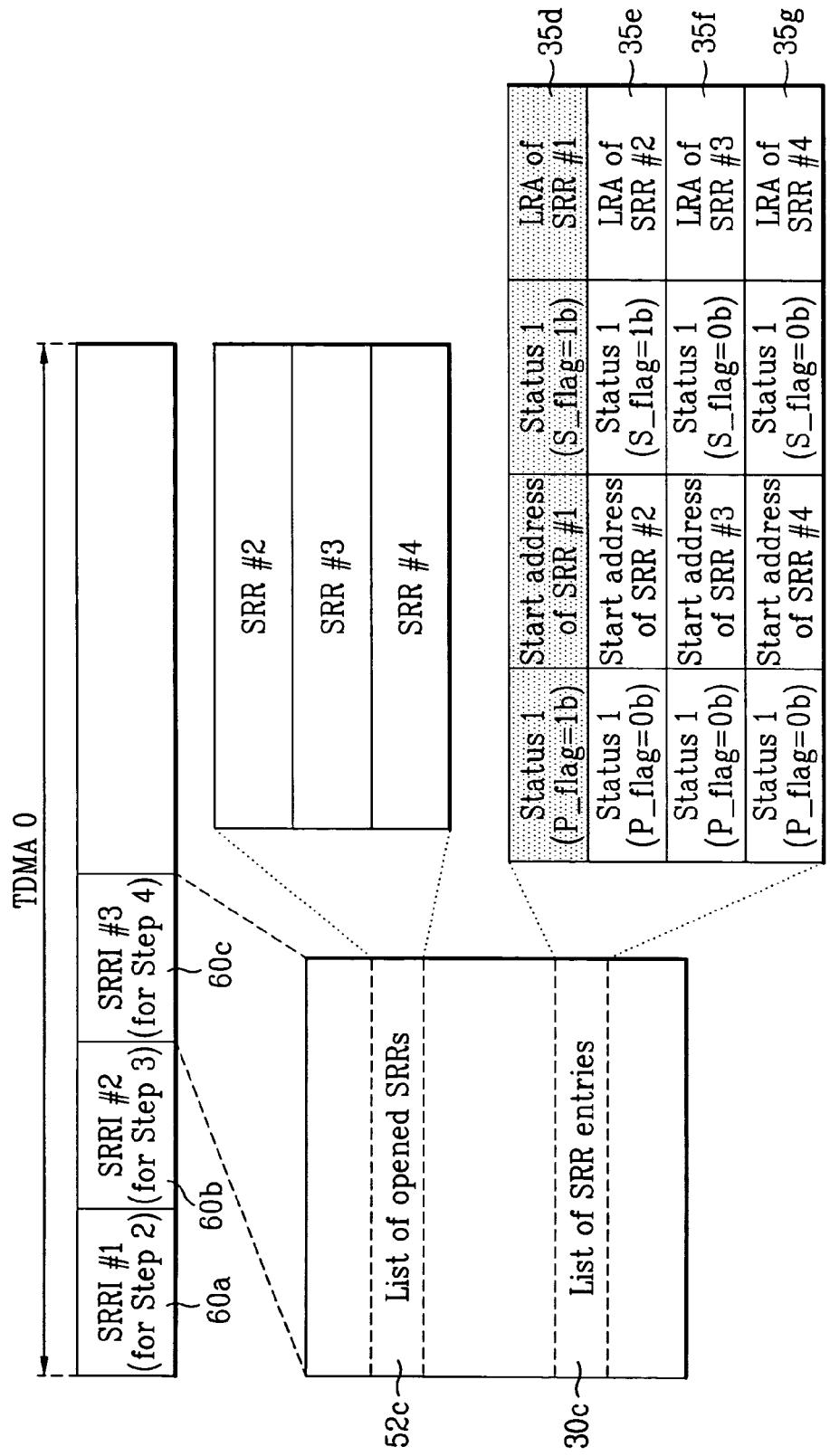

FIG. 9B illustrates a process of recording the disc recording status (SRRI) as it pertains to the disc state as of FIG. 9A. Since the SRRI is a third recorded SRRI, the SRRI is named SRRI #3 (60c). The SRRI #3 (60c) is recorded adjacent to the SRRI #2 (60b) in the TDMA0. For recording the status of the disc of FIG. 9A, since the entire area of the disc has three opened SRRs (SRRs #2, #3 and #4) and one closed SRR (SRR #1), the SRR numbers (SRRs #2, #3 and #4) of the opened SRRs are recorded in the "List of opened SRRs" field 52c of the SRRI #3. Information on all four SRRs (SRRs #1-#4) is recorded in the "List of SRR entries" field 30c of the SRRI #3 respectively as SRR entries 35d-35g.

Accordingly, since information on the newly created SRR #2, #3 and #4 is recorded in the SRRI #3 (60c) and user data is not yet recorded on the SRRs #2, #3 and #4, the P_flags of the corresponding SRR entries 35e, 35f, 35g are set to "1b". However, since the SRRs #3 and #4 are not the start SRR of the opened session #2, but the SRR #2 is the session start SRR, the S_flags of the SRR #2 entry 35e, the SRR #3 entry 35f and the SRR #4 entry 35g are set respectively to "1b", "0b" and "0b".

Figure 10A:
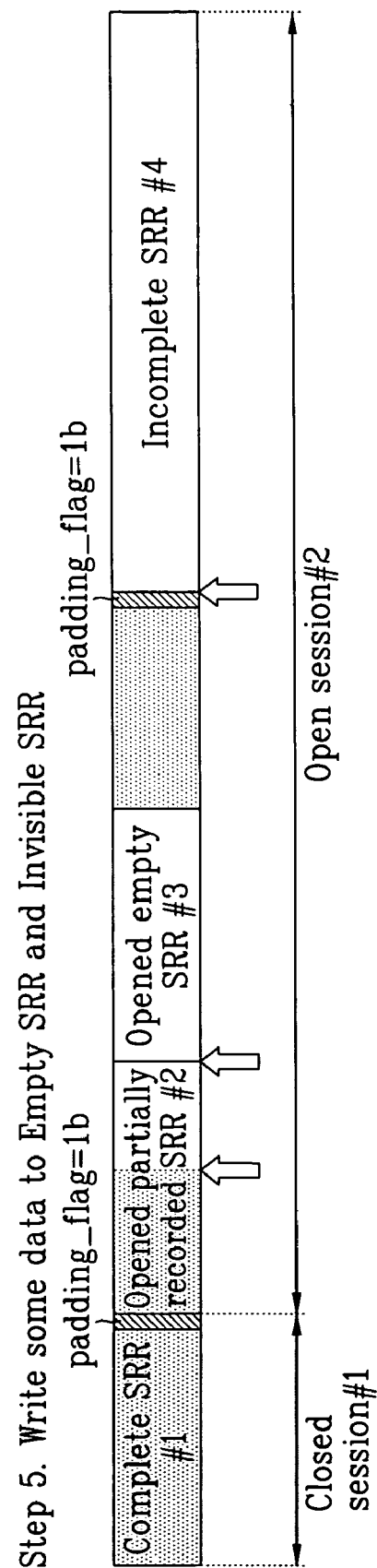

FIG. 10A shows Step 5 in which user data is recorded in the empty SRR #2 and in the invisible SRR #4 of FIG. 9A. Accordingly, the first empty SRR #2 is changed into a partially recorded SRR #2, and the invisible SRR #4 is changed into an incomplete SRR #4, but the opened empty SRR #3 is not changed. The SRR #2 is recorded with user data without padding. The SRR #4 is recorded with user data and is also padded with padding data. In the padded sector of the SRR #4, the Padding_flag is set to "1b".

Figure 10B:
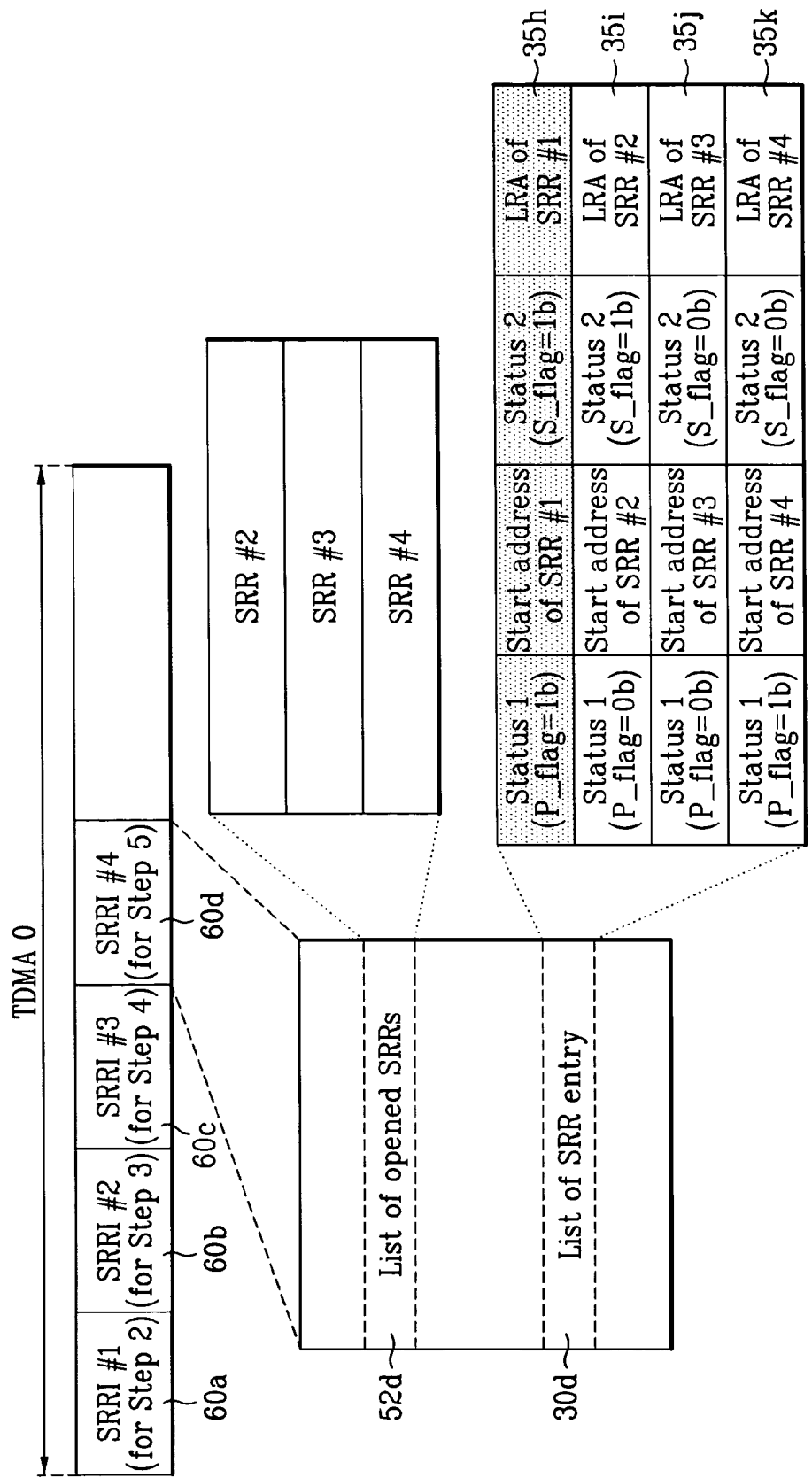

FIG. 10B illustrates a process of recording the disc recording status (SRRI) as it pertains to the disc state as of FIG. 10A. Since the SRRI is a fourth recorded SRRI, the SRRI is named SRRI #4 (60d). The SRRI #4 (60d) is recorded next to the SRRI #3 (60c). For recording the status of the disc of FIG. 10A, since the entire area of the disc has three opened SRRs (SRRs #2-#4) and one closed SRR (SRR #1), the SRR numbers of the opened SRRs (SRRs #2-#4) are recorded in the "List of opened SRRs" field 52d of the SRRI #4 (60d). Information on all four SRRs (SRRs #1-#4) is recorded in the "List of SRR entries" field 30d of the SRRI #4 (60d) respectively as SRR entries 35h-35k.

At this step, the number of the SRR entries and the location of the opened SRRs are the same as those shown in FIG. 9B, but since user data is recorded on a specific opened SRR, the LRA of the recorded opened SRR entry is changed and the value of the P_flag is also changed. In other words, information on the recorded SRRs #2 and #4 is updated. Since the SRR #2 is recorded with user data without padding, the P_flag of the SRR #2 entry 35i is maintained to be "0b". Since the SRR #4 is recorded with user data and is padded, the P_flag of the SRR #4 entry 35k is changed to be "1b".

Figure 11A:
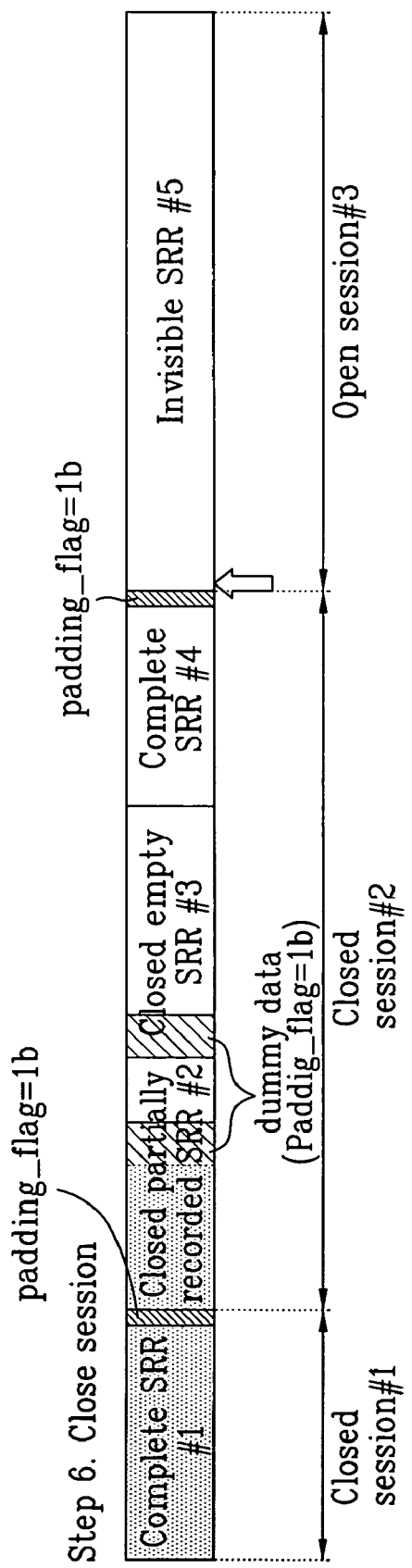

FIG. 11A shows Step 6 in which a session close command is received and executed when the disc is in the state of FIG.

10A. As shown in FIG. 11A, the additionally recordable portion of the opened SRR or a part of the additionally recordable portion of the opened SRR is padded with dummy data before the opened SRR is closed. As described above, the padding operation is an optional feature. In addition, when the padding is performed, specific data (for example, "CLSD" as character code) may be recordable as the padding data as described above.

The SRRs #2, #3 and #4 that were previously opened SRRs are changed into a closed partially recorded SRR #2, a closed empty SRR #3 and a complete SRR #4, which in turn form the closed session #2. In the SRRs #2 and #3, an additionally recordable area remains but is changed into a closed SRR by a close command. Herein, some portion is alternatively padded with dummy data. Accordingly, all the sectors in the cluster/SRR (e.g. FIG. 4B) padded with dummy data are set with Padding_flag=1b. However, even in this case, LRA recorded in the SRR entry means an end location where the user data are actually recorded. Dummy data portion does not affect the determination of the LRA location as described above. A remaining outermost SRR #5 is an invisible SRR #5, which in turn forms a new opened session #3.

Figure 11B:
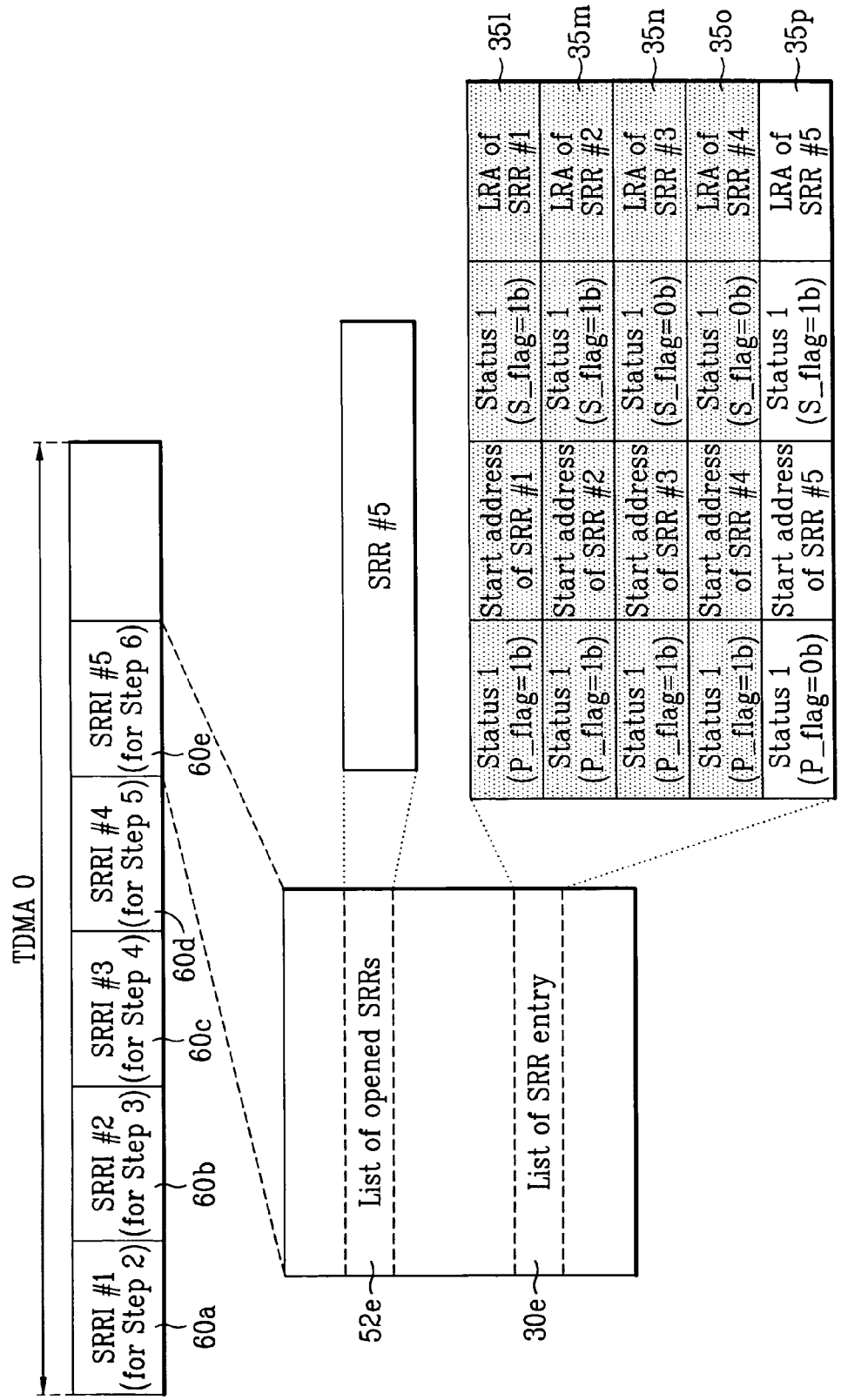

FIG. 11B illustrates a process of recording the disc recording status (SRRI) as it pertains to the disc state as of FIG. 11A. Since the SRRI is a fifth recorded SRRI in the management area, the SRRI is named SRRI #5 (60e). The SRRI #5 (60e) is recorded next to the SRRI #5 (60d) in the TDMA0. For recording the status of the disc of FIG. 11A, since the entire area of the disc has one opened SRR (SRR #5) and four closed SRRs (SRRs #1-#4), the SRR number of the opened SRR (SRR #5) is recorded in the "List of opened SRRs" field 52e of the SRRI #5, and all the previous opened SRR numbers (for example, SRRs #2, #3 and #4 in FIG. 10B) recorded in the SRRI #4 are removed from the current opened SRR list 52e. Removal of the SRRs from the "List of opened SRRs" field means that such SRRs are closed. Information on all five SRRs (SRRs #1-#5) is recorded in the "List of SRR entries" field 30e of the SRRI #5 respectively as SRR entries 35l-35p.

Since the SRRs #2 and #3 are padded with dummy data in response to the close command, the P_flags of the SRR #2 entry 35m and the SRR #3 entry 35n are changed to "1b" to indicate that at least a part of the corresponding SRR is padded with padding data. Since the LRA of an SRR entry is an end location where the user data is actually recorded, the LRAs of the SRRs #2-#4 have the same value as the previous LRAs recorded in the SRRI #4 (60d). In addition, since user data is not yet recorded on the newly created invisible SRR #5, the P_flag of the SRR #5 entry 35p is set to be "0b". Since the SRR #5 is a start SRR of the new session #3, the S_flag of the SRR #5 entry 35p is set to be "1b".

As can be seen through FIGS. 7A to 11B, SRRI is the information indicating the recording status of the current disc. When loading the optical disc of the present invention into the recording/playback apparatus, the recording/playback apparatus should check the latest SRRI (SRRI #5, in the above example) finally recorded in the management area. Since only the latest SRRI correctly indicates the final recording status of the disc, it is possible to check the location of the additionally recorded SRR.

However, when the power is suddenly turned off while using the disc or the disc is damaged, the latest SRRI of the disc may not be read out correctly. At this time, the final recording status need to be reconstructed using the latest SRRI among the non-damaged SRRIs. According to the present invention, the SRR is padded in the padding operation when the SRR is to be closed, and this padding information can be used to reconstruct the final recording status of the disc even when the latest SRRI on the disc is at a damaged condition. Through it, it is possible to recover the latest SRRI and the current recording status of the disc.

Figure 13A:
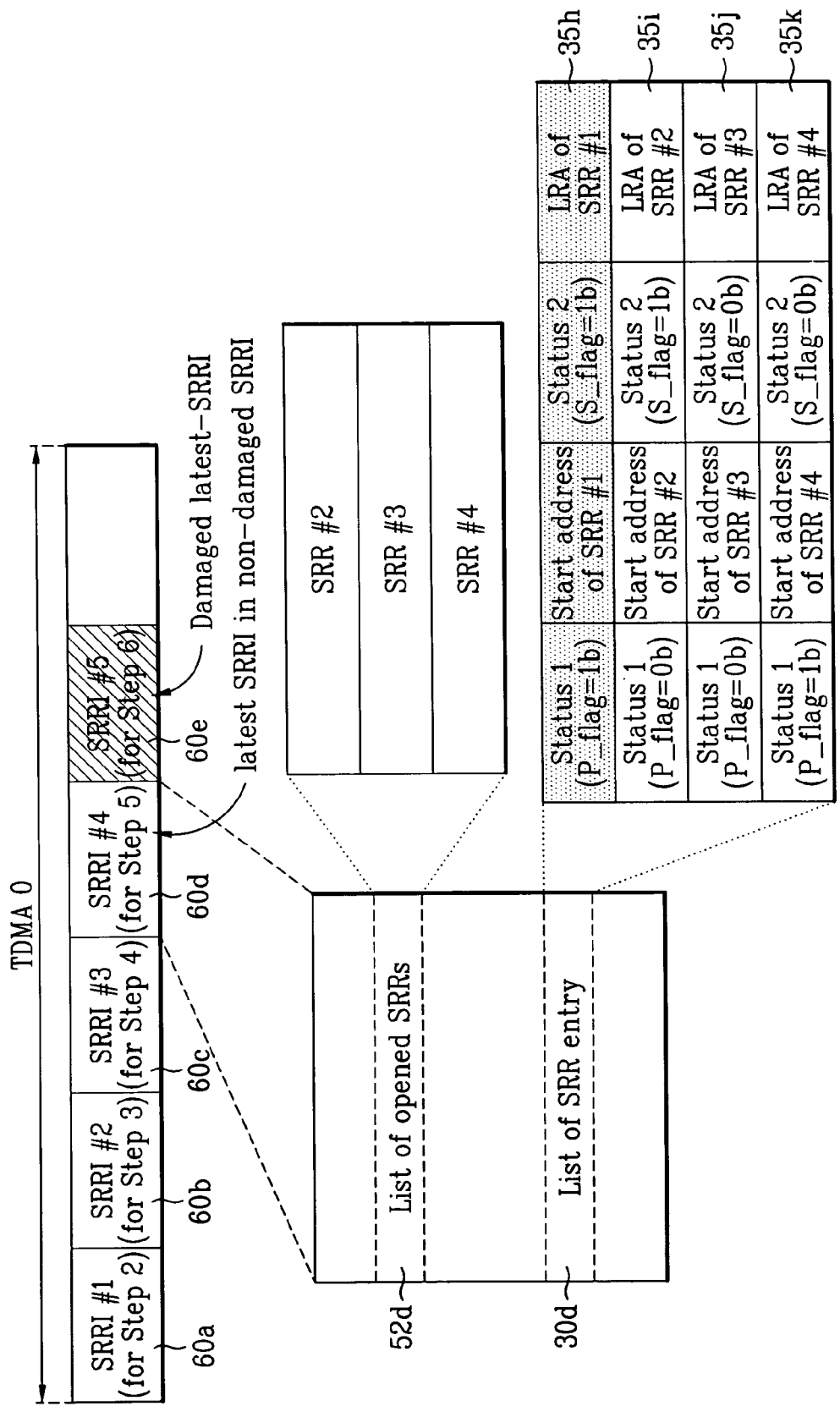

FIGS. 12, 13A and 13B illustrate a method of recording data on a write-once optical disc according to the present invention. This method estimates the final recording status of the disc, recovers the latest SRRI of the disc even when the latest SRRI is damaged. The recording/playing back can be performed using the final recording status obtained from the latest SRRI.

When the corresponding SRRI is judged as a defective area and the recorded information is not reliable, the SRRI is said to be damaged. If the latest SRRI is damaged, it means that the final recording status of the disc cannot be obtained from the latest SRRI. Therefore, the recordable location of the disc cannot be known. In the worst case, the disc itself cannot be used any more.

The present invention provides the method of correctly recovering the final recording status of the disc when the latest SRRI is damaged. Particularly, FIG. 12 is a flowchart illustrating a method of recovering the final recording status of a write-once optical disc such as a BD-WO and performing the recording/playback operation on the disc according to an embodiment of the present invention. The disc contains the disc structure and the SRRI structure as discussed above.

Referring to FIG. 12, if the disc is loaded in an optical recording/playback apparatus such one shown in FIG. 14, the latest SRRI recorded within the management area (e.g., the TDMA0) is read out. Then, it is checked whether or not the read SRRI is damaged (S10).

If the latest SRRI is not damaged, the final disc recording status is obtained from the latest SRRI (S21). Then using the latest SRRI, the recording is performed to only the additionally recordable area and/or the playback operation is performed to the already recorded area (S22). The information on such areas is obtained from the latest SRRI.

On the other hand, if the step S10 determines that the latest SRRI is damaged, the latest SRRI among the non-damaged SRRI(s) is determined (S31). Then this latest non-damaged SRRI is read out (S32). The damaged SRRI can be recovered using the latest non-damaged SRRI and the actual recording status of the disc (S33). Step S33 may be an optional step. The recording is performed to the additionally recorded area and/or the playback operation is performed to the already recorded area (S34). Information on such areas can be determined from the latest non-damaged SRRI and/or the actual recording status of the disc. After the recording/playback step S34, the newly changed recording status may be recorded as a new SRRI in the management area.

FIGS. 13A and 13B illustrates an example of the step S33 in FIG. 12 of recovering the final recording status when the latest SRRI (SRRI #5 in the example of FIG. 11B) is damaged. For the convenience of explanation, the SRRI recording method of FIGS. 7A to 11B will be described as an example.

As shown in FIG. 13A, if the SRRIs are in the normal status, the SRRI #5 (60e) becomes the latest SRRI of the disc. However, if the SRRI #5 is damaged, the recording/playback apparatus reads the latest SRRI among the non-damaged SRRIs. In the example, the SRRI #4 (60d) is the latest SRRI among the non-damaged SRRIs #1-#4.

The actual recording status associated with Step 6 in FIG. 11A can be determined from the SRRI #5 (60e) which is written as indicated in FIG. 11B. However, since the SRRI #5 (60e) is damaged, the latest SRR information that can be checked by the recording/playback apparatus is the SRRI #4 (60d). But the SRRI #4 does not necessarily carry the final recording status of the disc since the SRRI #5 carries this information. Then, in order to recover the final recording status of the disc without using the SRRI #5, the SRRI #4 and the actual final recording status of the disc need to be compared. This can be accomplished as follows.

The recording/playback apparatus (e.g., FIG. 14) checks the location of the opened SRR(s) and the associated LRA information from the SRRI #4. In the example of FIG. 13A, it is determined from the "List of opened SRRs" field 52d of the SRRI #4 (60d) that there are three opened SRRs #2, #3 and #4. Then by accessing the LRA field of these SRR entries corresponding to these opened SRRs from the "List of SRR entries" field 30d of the SRRI #4 (60d), the LRAs are obtained and used to verify whether the corresponding SRR is truly an opened SRR. In this regard, only the opened SRR(s) identified in the field 52d of the SRRI #4 (60d) are examined. The location recorded with the closed SRR(s) may not be verified. Once an opened SRR is changed to a closed SRR, the closed SRR cannot be changed back to an opened SRR. As a result, the recovery of the final SRR information is possible by checking whether each of the opened SRR(s) is changed to the closed SRR.

In the case of the SRRs #2 and #3 that are identified as the opened SRRs in the field 52d of the SRRI #4 (60d), each of the SRRs #2 and #3 is examined to determine whether or not predetermined padding data (e.g., dummy data) are recorded after its LRA (identified in the LRA field of the entry), as can be seen from FIG. 11A (actual final disc recording status). If the padding is detected, then the recording/playback apparatus determines that the corresponding opened SRR is changed to a closed SRR.

In the case of the SRR #4 that is recognized as the opened SRR from the field 52d of the SRRI #4, the recording/playback apparatus examines the SRR #4 to determine whether or not the padding data (e.g., dummy data) are presented after its LRA location in FIG. 11A (actual final disc recording status). The SRR #4 can be analyzed as the opened SRR in the actual final disc recording status. Also, it can be seen that an area after the LRA location of the SRR #4 is recordable, i.e., this area is the NWA. Then in the recording/playback apparatus, the already recorded area of the original SRR #4 is determined to a closed SRR (new closed SRR #4) and only the recordable area of the original SRR #4 is analyzed as the opened SRR (new SRR #5). Thus the contents of the damaged SRRI #5 can be reconstructed by using the above analysis results. Moreover, since the information necessary to perform the recording operation by the recording/playback apparatus is the additionally recordable position information (NWA), the NWA location in association with the old and new SRR #4 is not changed and thus can be used by the recording/playback apparatus.

FIG. 13B illustrates a result of the recovery of the latest SRRI #5 by the process of FIG. 13A as discussed above. This result accords with the final recording status of the actual disc. Accordingly, the recording/playback apparatus again records the selectively recovered latest SRRI #5 within the management area (at this time, as the SRRI #6 (60f)), or performs the recording to only the additionally recordable area. The SRRI #6 (60f) includes the "List of opened SRRs" field 52f identifying the SRR #5, and the "List of SRR entries" field 30f containing SRR entries 35q-35u corresponding respectively to the SRRs #1-#5. Also, even if the recovered SRRI #5 is not recorded as the SRRI #6, data recording is performed from the recovered NWA information and the recording status as changed by the data recording to the recovered NWA is recorded as a new SRRI #6.

FIG. 14 illustrates an optical disc recording/playback apparatus according to the present invention. This apparatus or other suitable apparatus or system can be used to implement the disc and/or SRRI structures and methods of the present invention discussed herein.

Referring to FIG. 14, the optical disc recording/playback apparatus includes a recording/playback unit 10 for recording and/or reproducing data to/from the optical disc and a controller 20 for controlling the recording/playback unit 10. All the elements of the recording/playback apparatus are operatively coupled. The controller 20 transmits a command for recording and/or reproducing to/from a special recording area such as an SRR/session on the disc, to the recording/playback unit 10. The recording/playback unit 10 records and/or reproduces data to/from the disc according to the commands of the controller 20.

The recording/playback unit 10 includes an interface unit 12, a pick-up unit 11, a data processor 13, a servo unit 14, a memory 15 and a microcomputer 16. The interface unit 12 communicates with external devices such as the controller 20. The pick-up unit 11 records or reproduces data to/from the optical disc directly. The data processor 13 receives a reproduction signal from the pick-up unit 11, restores a preferred signal, modulates a signal proper to the optical disc, and transmits the signal. The servo unit 14 controls the pick-up unit 11 to read the signal from the optical disc or to record the signal to the optical disc. The memory 15 stores temporarily data and various information including management information as discussed herein. The microcomputer 16 controls the components of the recording/playback unit 10. Since the recording/playback apparatus shown in FIG. 14 can selectively perform a padding operation, a designer can more freely design the recording/playback apparatus. The recording/playback unit 10 can automatically store specific data during a padding operation.

The method of recording and playing back data on an optical disc is classified into two kinds. The first one is the case of FIGS. 4A through 11B, which involves the method of completely recording data on an opened SRR, forcedly padding the remaining sector(s) in the cluster including the LRA, and recording information identifying whether or not padding has been performed to the remaining sector(s), or determining whether or not to pad the cluster and recording padding identification information according to the padding when closing an SRR.

The second one is the method of effectively recovering a damaged SRRI using the padding information of FIGS. 12-13B. When closing an SRR, padding the SRR is optionally performed. However, if the padding is performed to the SRR and then the SRR is closed, then this padding information can be used advantageously to recover data.

The first recording/playback method of the optical disc according to an embodiment of the present invention will be described in detail. When the optical disc such as a BD-WO is loaded into the recording/playback apparatus such as the one shown in FIG. 12, the latest SRRI is read as the latest disc management information recorded in a TDMA. Furthermore, the SRRI header and the SRR entry(ies) recorded in the latest SRRI are read and temporarily stored in the memory 15 of the recording/playback unit 10.

The stored SRRI represents the latest disc recording status. The opened SRR(s) can be identified through the SRRI header information. Through the SRR entry(ies), data can be recorded in the entire area of the disc or the existence and location of the non-recording status and opened session can be checked. Also, it can be identified whether or not the SRR has been padded with padding data. All such information can be used when the optical disc is recorded and played back.

Then, data (e.g., user data) is recorded on a specific opened SRR. When the data is completely recorded in the opened SRR, the unrecorded sector(s) in the cluster including the LRA is padded with dummy data (e.g., for stability and robust reasons) and the padding identification information Padding_flag is set to "1b". For each of the padded sectors, Padding_flag corresponding to each sector is set to "1b". If the sector is not padded, then the corresponding Padding_flag is set to "0b". Also, when the SRR entry in the SRRI is updated, the SRR status information P_flag is set to "1b" to indicate that the corresponding SRR has at least some part that is padded.

Additionally, even in the case where the SRR is closed by a close command of the controller 20, the microcomputer 16 can select whether a recordable area (for example, one cluster) closed after padding or without padding. In the above case, a designer can design so that the recording/playback unit 10 automatically pads the SRR with padding data and closes the SRR unconditionally without a padding command from the controller 20. The above function is called "automatic padding function" by the recording/playback unit 10. The automatic padding function is more advantageous to reduce padding operation time, compared to the case where the recording/playback unit 10 receives dummy data by a padding command and pads the SRR thereafter.

In addition, if the SRR status is changed by padding as described above, the Padding_flag is set to 1b according to each padded sector. Furthermore, the P_flag is set to 1b in the corresponding SRR entry. Different recording/playback apparatuses can use such information.

Accordingly, the types and definitions of the SRRs as defined by the present invention and a method of recording the SRRI according to the defined SRR types and definitions, are provided. Accordingly, various recording/playback apparatuses having desired functions can be used to access the present disc.

In addition, the second method for recording and playing back data by recovering the optical disc will be described. When an optical disc is loaded into the recording/playback apparatus, the microcomputer 16 controls the pickup unit 11 to read the latest SRRI recorded in the set management area such as TDMA of the corresponding disc. The microcomputer 16 determines whether the latest SRRI is damaged. If it is determined that the latest SRRI is damaged, the latest SRRI is estimated and recovered from non-damaged SRRIs as described above referring to FIGS. 12, 13A and 13B. When the opened SRR is changed into the closed SRR by a close command, the dummy data with which the disc is padded is checked, so that the latest SRRI can be recovered as described above.

If the recovered latest SRRI or the original latest SRRI is not damaged, the recording/playback unit 10 checks the location of the additionally recordable opened SRR based on the corresponding latest SRRI, records data, receives a close command of the controller 20, pads some portion (or entire area) of an additionally recordable area remaining in the opened SRR with dummy data, and represents that the SRR is changed to a closed SRR. The changed disc recording status is recorded as a new (latest) SRRI in a management area. After that, when the corresponding optical disc is loaded again, the final disc recording status can be exactly checked from the latest SRRI.

The method for recording management information of the write-once optical disc according to the present invention includes defining new SRR types and session types. If an open SRR is padded or if the SRR is closed by padding, padding identification information Padding_flag is set appropriately and recorded in the padded area. Other padding identification information P_flag is recorded in the SRR entry. Consequently, in the write-once optical disc having the new physical structure, the management information can be effectively recorded and managed. When the SRR is closed after padding, the padding information can be used to recover the damaged SRRI.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording management information for finding a recordable area on a write-once recording medium including a sequential recording-unit composed of at least one basic recording-unit, the at least one basic recording-unit composed of a plurality of sectors, the method comprising:
   recording user data sequentially from a writable location in the sequential recording-unit in the direction of increasing address;
   padding, with dummy data, remaining unrecorded sectors of a last basic recording-unit when an address of a last recorded location of the user data does not match with a last sector in the last basic recording-unit upon terminating the step of recording user data sequentially; and
   recording padding identification information distinguishing a sector in which actual user data is recorded from a sector padded with the dummy data, the padding identification information being recorded within the corresponding basic recording-unit.

2. The method of claim 1, the method further comprising:
   padding, with the dummy data, one or more basic recording-units from the new writable location.

3. The method of claim 1, wherein the writable location in the sequential recording-unit is moved to a new writable location, the new writable location being a first sector of an available adjacent basic recording-unit.

4. The method of claim 1,
   wherein the padding identification information comprises a plurality of padding flags, each of the padding flags pertaining to a corresponding one of the sectors.

5. The method of claim 1, wherein each of the at least one basic recording-unit has a size of a cluster.

6. A write-once recording medium, comprising:
   a sequential recording-unit composed of at least one basic recording-unit, the at least one basic recording-unit composed of a plurality of sectors;
   user data sequentially recorded from a writable location in the sequential recording-unit in the direction of increasing address; and
   dummy data recorded in remaining unrecorded sectors of a last basic recording-unit when an address of a last recorded location of the user data does not match with a last sector in the last basic recording-unit after the user data is sequentially recorded,
   wherein padding identification information is recorded within the corresponding basic recording-unit, the padding identification information distinguishing a sector in which actual user data is recorded from a sector padded with the dummy data.

7. The write-once recording medium of claim 6, further comprising:
   dummy data recorded in one or more basic recording-units from the new writable location.

8. The write-once recording medium of claim 6, wherein the writable location in the sequential recording-unit is moved to a new writable location, the new writable location being a first sector of an available adjacent basic recording-unit.

9. The write-once recording medium of claim 5, wherein the padding identification information comprises a plurality of padding flags, each of the padding flags pertaining to a corresponding one of the sectors.

10. An apparatus for recording management information for finding a recordable area on a write-once recording medium including a sequential recording-unit composed of at least one basic recording-unit, the at least one basic recording-unit composed of a plurality of sectors, the apparatus comprising:
an optical pickup to record data on the write-once recording medium; and
a microcomputer operatively coupled to the optical pickup and configured to control the optical pickup to record user data sequentially from a writable location in the sequential recording-unit in the direction of increasing address; and control the optical pickup to pad, with dummy data, remaining unrecorded sectors of a last basic recording-unit when an address of a last recorded location of the user data does not match with a last sector in the last basic recording-unit after the user data is sequentially recorded,
wherein the microcomputer is further configured to record padding identification information distinguishing a sector in which actual user data is recorded from a sector padded with dummy data, the padding identification information being recorded within the corresponding basic recording-unit.

11. The apparatus of claim 10, wherein the microcomputer is configured to move the writable location in the sequential recording-unit to a new writable location, the new writable location being a first sector of an available adjacent basic recording-unit.

12. The apparatus of claim 10, wherein
the padding identification information comprises a plurality of padding flags, each of the padding flags pertaining to a corresponding one of the sectors.

13. The apparatus of claim 10, wherein each of the at least one basic recording-unit has a size of a cluster.

14. A method for reproducing user data from a write-once recording medium, the write-once recording medium including at least one basic recording-unit including a plurality of sectors, wherein user data is sequentially recorded from a writable location in the sequential recording-unit in the direction of increasing address and dummy data is padded in remaining unrecorded sectors of a last basic recording-unit when an address of a last recorded location of the user data does not match with a last sector in the last basic recording-unit after the user data is sequentially recorded, the method comprising:
reading padding identification information from the basic recording-unit, the padding identification information distinguishing a sector in which actual user data is recorded from a sector padded with the dummy data; and
reproducing user data except the padded dummy data in the basic recording-unit according to the padding identification information.

15. The method of claim 14, wherein the padding identification information comprises:
a plurality of padding flags, each of the padding flags pertaining to a corresponding sector.

16. An apparatus for reproducing user data from a write-once recording medium, the write-once recording medium including at least one basic recording-unit including a plurality of sectors, wherein user data is sequentially recorded from a writable location in the sequential recording-unit in the direction of increasing address and dummy data is padded in remaining unrecorded sectors of a last basic recording-unit when an address of a last recorded location of the user data does not match with a last sector in the last basic recording-unit after the user data is sequentially recorded, the apparatus comprising:
an optical pickup configured to reproduce data from the write-once recording medium; and
a microcomputer operatively coupled to the optical pickup and configured to control the optical pickup to reproduce padding identification information from the basic recording-unit, the padding identification information distinguishing a sector in which actual user data is recorded from a sector padded with the dummy data, the microcomputer further configured to control the optical pickup to reproduce user data except the padded dummy data in the basic recording-unit according to the padding identification information.

17. The apparatus of claim 16, wherein the padding identification information comprises:
a plurality of padding flags, each of the padding flags pertaining to a corresponding one of sectors.

* * * * *